US012731324B2

(12) United States Patent
Hoydis et al.

(10) Patent No.: US 12,731,324 B2
(45) Date of Patent: Sep. 8, 2026

(54) NEURAL COMPONENTS FOR DIFFERENTIABLE RAY TRACING OF RADIO PROPAGATION

(71) Applicant: NVIDIA Corporation, Santa Clara, CA (US)

(72) Inventors: Jakob Richard Hoydis, Paris (FR); Faycal Ait Aoudia, Santa Clara, CA (US); Sebastian Cammerer, Tuebingen (DE); Alexander Georg Keller, Berlin (DE); Merlin Nimier-David, Nyon (CH); Nikolaus Binder, Berlin (DE); Guillermo Anibal Marcus Martinez, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 247 days.

(21) Appl. No.: 18/653,088

(22) Filed: May 2, 2024

(65) Prior Publication Data

US 2025/0104329 A1 Mar. 27, 2025

Related U.S. Application Data

(60) Provisional application No. 63/585,914, filed on Sep. 27, 2023.

(51) Int. Cl.

| | |
|---|---|
| ***G06T 15/06*** | (2011.01) |
| ***G06T 17/05*** | (2011.01) |
| ***H04W 16/18*** | (2009.01) |

(52) U.S. Cl.

CPC .............. *G06T 15/06* (2013.01); *G06T 17/05* (2013.01); *H04W 16/18* (2013.01); *G06T 2207/20081* (2013.01); *G06T 2207/20084* (2013.01)

(58) Field of Classification Search

CPC ..................... G06T 15/06; G06T 17/05; G06T 2207/20081; G06T 2207/20084; H04W 16/18

See application file for complete search history.

(56) References Cited

U.S. PATENT DOCUMENTS

| | | | |
|---|---|---|---|
| 6,249,252 | B1 | 6/2001 | Dupray et al. |
| 6,487,417 | B1 | 11/2002 | Rossoni et al. |

(Continued)

OTHER PUBLICATIONS

Yun, Z., et al., "Ray tracing for radio propagation modeling: Principles and applications," IEEE Access, vol. 3, Jul. 2015.

(Continued)

*Primary Examiner* — King Y Poon
*Assistant Examiner* — Vincent Peren
(74) *Attorney, Agent, or Firm* — Leydig, Voit & Mayer, Ltd.

(57) ABSTRACT

Apparatuses, systems, and techniques relate to neural components for differentiable ray tracing of radio propagation. Differentiable ray tracing may be used to refine the scene geometry of the physical environment, to learn or optimize the scene properties of objects in the scene, to learn or optimize the scene properties of antennas, and to learn or optimize antenna patterns, array geometries, and orientations and positions of transmitters and receivers. Once scene properties have been learned or optimized, the differentiable ray tracer may further be used to simulate the performance of different configurations of the transmitters, receivers, and scene geometry. In an embodiment, one or more of the scene geometry, scene properties, and antenna characteristics are computed by a differentiable parametric function, such as a neural network, etc. and parameters of the differentiable parametric function are learned using the differentiable ray tracing.

22 Claims, 14 Drawing Sheets

350

Compute, by a differentiable ray tracer, simulated radio characteristics for a 3D scene based on configured parameters and at least one trainable parameter corresponding to a scene property, where for each ray intersection point in the 3D scene, a neural component estimates the at least one trainable parameter
355

Update weights applied by the neural component to estimate the at least one trainable parameter using gradient-based optimization to minimize a loss function of the simulated radio characteristics and reference radio characteristics
360

(56) References Cited

U.S. PATENT DOCUMENTS 6,636,743 B1 10/2003 Vicharelli et al.
7,274,332 B1 9/2007 Dupray et al.
7,313,402 B1 12/2007 Rahman et al.
8,509,809 B2 8/2013 Hirsch et al.
8,768,344 B2 7/2014 Naguib et al.
8,948,742 B2 2/2015 Horton et al.
8,994,591 B2 3/2015 Dupray et al.
9,080,889 B2 7/2015 Shrum et al.
10,224,991 B2 3/2019 Nair et al.
11,252,731 B1 2/2022 Levitsky
11,863,266 B2 1/2024 Mo et al.
12,119,914 B2 10/2024 Chawa et al.
12,339,366 B2 6/2025 Chai et al.
12,348,983 B1 7/2025 Lin et al.
12,362,472 B2 7/2025 McCandless et al.
12,425,987 B2 9/2025 Black et al.
2001/0022558 A1 9/2001 Karr et al.
2002/0002046 A1 1/2002 Okanoue et al.
2004/0266457 A1 12/2004 Dupray et al.
2006/0070113 A1 3/2006 Bhagwat et al.
2007/0019769 A1 1/2007 Green et al.
2007/0177680 A1 8/2007 Green et al.
2009/0076788 A1 3/2009 Sugahara et al.
2010/0003991 A1 1/2010 Pao et al.
2011/0021156 A1 1/2011 Kobayashi et al.
2011/0156957 A1 6/2011 Waite et al.
2011/0244901 A1 10/2011 Sugahara et al.
2011/0287778 A1 11/2011 Levin et al.
2011/0287784 A1 11/2011 Levin et al.
2011/0287801 A1 11/2011 Levin et al.
2013/0155102 A1 6/2013 Gonia et al.
2013/0285855 A1 10/2013 Dupray et al.
2013/0342565 A1 12/2013 Sridhara et al.
2014/0179340 A1 6/2014 Do et al.
2014/0320348 A1 10/2014 Ly Nguyen et al.
2015/0133167 A1 5/2015 Edge et al.
2016/0077190 A1 3/2016 Julian
2016/0088440 A1 3/2016 Palanki et al.
2016/0188631 A1 6/2016 Deb et al.
2018/0093183 A1* 4/2018 Leblanc .................. A63F 13/52
2018/0138996 A1 5/2018 Lee et al.
2018/0139623 A1 5/2018 Parlk et al.
2018/0164400 A1 6/2018 Wirola et al.
2018/0266826 A1 9/2018 Wang et al.
2019/0005166 A1 1/2019 Yamauchi et al.
2019/0021068 A1 1/2019 Yuan et al.
2019/0150006 A1 5/2019 Yang et al.
2019/0222652 A1 7/2019 Graefe et al.
2019/0253900 A1 8/2019 Narasimha et al.
2019/0342763 A1 11/2019 Jung et al.
2019/0357056 A1 11/2019 An et al.
2019/0372644 A1 12/2019 Chen et al.
2019/0373595 A1 12/2019 Sadiq et al.
2019/0380090 A1 12/2019 Kim et al.
2020/0106477 A1 4/2020 Nanni et al.
2020/0311985 A1 10/2020 Jeong et al.
2020/0372699 A1* 11/2020 Raposo Subtil .......... G06T 1/20
2020/0405393 A1 12/2020 Villongco
2021/0044366 A1 2/2021 Cody et al.
2021/0044988 A1 2/2021 Park et al.
2021/0051678 A1 2/2021 Suzaki et al.
2021/0068170 A1 3/2021 Sadhu et al.
2021/0167878 A1 6/2021 Lee et al.
2021/0263128 A1 8/2021 Smith et al.
2021/0266758 A1 8/2021 Fujiwaka et al.
2021/0329478 A1 10/2021 Nishikawa et al.
2021/0360456 A1 11/2021 Ratnam et al.
2021/0376905 A1 12/2021 Zhou et al.
2021/0409966 A1 12/2021 Lee et al.
2022/0076061 A1 3/2022 Fiterman
2022/0103272 A1 3/2022 Dietrich et al.
2022/0107383 A1 4/2022 Rappaport et al.
2022/0121789 A1 4/2022 Kanza et al.
2022/0174520 A1 6/2022 Sakamoto et al.
2022/0182840 A1 6/2022 Ohtsuji et al.
2022/0264514 A1 8/2022 Butt et al.
2022/0345185 A1 10/2022 Michalopoulos et al.
2022/0352933 A1 11/2022 Rakib et al.
2022/0377568 A1 11/2022 Kanza et al.
2022/0383118 A1 12/2022 Nair et al.
2023/0037893 A1 2/2023 Vankayala et al.
2023/0059198 A1 2/2023 Moriuchi et al.
2023/0062443 A1 3/2023 Chakraborty et al.
2023/0075165 A1 3/2023 Lindquist et al.
2023/0096553 A1 3/2023 Metwaly Saad et al.
2023/0147351 A1 5/2023 Machin et al.
2023/0147767 A1 5/2023 Hiraoka et al.
2023/0154145 A1 5/2023 Zakharov et al.
2023/0155662 A1 5/2023 Barbu et al.
2023/0169241 A1 6/2023 Liu et al.
2023/0177327 A1 6/2023 Pillai et al.
2023/0194279 A1 6/2023 Kakosyan et al.
2023/0231635 A1 7/2023 Okamoto et al.
2023/0284074 A1 9/2023 Kundu et al.
2023/0316062 A1 10/2023 Balevi et al.
2023/0324501 A1 10/2023 Feigl et al.
2023/0361897 A1 11/2023 Racz et al.
2023/0403672 A1 12/2023 Takeuchi et al.
2024/0070353 A1 2/2024 Wang et al.
2024/0095473 A1 3/2024 Sakurai et al.
2024/0111937 A1 4/2024 Jaiswal et al.
2024/0112009 A1 4/2024 Orekondy et al.
2024/0118954 A1 4/2024 Boccuzzi et al.
2024/0129751 A1 4/2024 Belgiovine et al.
2024/0155369 A1 5/2024 Inomata et al.
2024/0155385 A1 5/2024 Inomata et al.
2024/0214093 A1 6/2024 Kim et al.
2024/0265619 A1 8/2024 Aoudia et al.
2024/0267173 A1 8/2024 Paz et al.
2024/0284522 A1 8/2024 Dutta et al.
2024/0323719 A1* 9/2024 Corgan ................ H04W 24/06
2024/0361469 A1 10/2024 Dupray et al.
2024/0364437 A1 10/2024 Hehn et al.
2024/0364565 A1 10/2024 Gilbert et al.
2024/0388472 A1 11/2024 Hirzallah et al.
2024/0411471 A1 12/2024 Luo et al.
2024/0430719 A1 12/2024 Higuchi et al.
2025/0005856 A1 1/2025 Qiu et al.
2025/0067897 A1 2/2025 Gan et al.
2025/0078723 A1 3/2025 Chen
2025/0104329 A1 3/2025 Hoydis et al.
2025/0113234 A1 4/2025 Alanen et al.
2025/0175272 A1 5/2025 Hehn et al.
2025/0182379 A1 6/2025 Cammerer et al.
2025/0183943 A1 6/2025 Wong et al.
2025/0184875 A1 6/2025 Krunz et al.
2025/0192853 A1 6/2025 Cho et al.
2025/0192855 A1 6/2025 Cho et al.
2025/0234331 A1 7/2025 Alkhateeb et al.
2025/0240765 A1 7/2025 Hirzallah et al.
2025/0245392 A1 7/2025 Park et al.
2025/0251480 A1 8/2025 Lin et al.
2025/0259374 A1 8/2025 Fazal et al.
2025/0260948 A1 8/2025 Hill et al.
2025/0280383 A1 9/2025 Reddy et al.
2025/0300751 A1 9/2025 Zhang et al.
2025/0310784 A1 10/2025 Nakahira et al.
2025/0316016 A1 10/2025 Nguyen et al.
2025/0317224 A1 10/2025 Shah et al.
2025/0327895 A1 10/2025 Popov et al.

OTHER PUBLICATIONS

Bourdoux, A., et al., “6G White Paper on Localization and Sensing,” University of Oulu: 6G Research Visions, Jun. 2020.

Alkhateeb, A., et al., “DeepSense 6G: A large-scale real-world multi-model sensing and communication dataset,” arXiv Preprint arXiv:2211.09769, 2022.

Renzo, M.D., et al., “Smart radio environments empowered by reconfigurable AI meta-surfaces: An idea whose time has come,” vol. 2019, No. 1, p. 129, May 2019.

(56) References Cited

OTHER PUBLICATIONS

Studer, C., et al., "Channel charting: Locating users within the radio environment using channel state information," IEEE Access, vol. 6, pp. 47 682-47 698, 2018.
Hoydis, J., et al., "Toward a 6G AI-Native Air Interface," IEEE Commun. Mag., vol. 59, No. 5, pp. 76-81, May 2021.
Alkhateeb, A., et al., "Real-time digital twins: Vision and research directions for 6G and beyond," arXiv e-prints, pp. arXiv-2301, 2023.
Lin, X., et al., "6G Digital Twin Networks: From Theory to Practice," arXiv preprint arXiv:2212.02032, 2022.
Bakirtzis, S., et al., "DeepRay: Deep Learning Meets Ray-Tracing," in 16th European Conf. Ant. Prop. (EuCAP), Madrid, Spain, Mar. 2022, pp. 1-5.
Azpilicueta, L., et al., "A ray launching-neural network approach for radio wave propagation analysis in complex indoor environments," IEEE TRans. Antennas Propag. vol. 62, No. 5, pp. 2777-2786, Feb. 2014.
Zhang, X., et al., "Cellular network radio propagation modeling with deep convolutional neural networks," in Proc. 26th ACM SIGKDD Int. Conf. Knowledge Discovery and Data Mining, Aug. 2020, pp. 2378-2386.
Levie, R., et al., "RadioUNet: Fast Radio Map Estimation with Convolutional Neural Networks," IEEE Trans. Wireless Commun., vol. 20, No. 6, pp. 4001-4015, Feb. 2021.
Eller, L., et al., "A Deep Learning Network Planner: Propagation Modeling Using Real-World Measurements and a 3D City Model," IEEE Access, vol. 10, pp. 122 182-122 196, Nov. 2022.
Gupta, A., et al., "Machine Learning-Based Urban Canyon Path Loss Prediction Using 28 GHz Manhattan Measurements," IEEE Trans. Antennas Propag., vol. 70, No. 6, pp. 4096-4111, Feb. 2022.
Orekondy, T., et al., "WiNeRT: Towards neural ray tracing for wireless channel modelling an differentiable simulations," In International Conference on Learning Representations, 2023.
Muller, T., et al., "Instant neural graphics primitives with a multiresolution hash encoding," ACM Trans. Graph., vol. 41, No. 4, pp. 102:1-102:15, Jul. 2022.
Li, T.M., et al., "Differentiable Monte Carlo ray tracing through edge sampling," ACM Trans. Graph, vol. 37, No. 6, Dec. 2018.
Jakob, W., et al., "Dr. Jit: A just-in-time compiler for differentiable rendering," Transactions on Graphics (Proceedings of SIGGRAPH), vol. 41, No. 4, Jul. 2022.
Li, Z., et al., "Neuralangelo: High-fidelity neural surface reconstruction," in IEEE Conf. Computer Vision and Pattern Recognition (CVPR), 2023.
Kanhere, O., et al., "Calibration of NYURay, a 3D mmWave and sub-THz ray tracer using indoor, outdoor, and factory channel measurements," arXiv preprint arXiv:2302.12380, Feb. 2023.
Jemai, J., et al., "Calibration of a UWB sub-band channel model using simulated annealing," IEEE Trans. Antennas Propag. vol. 57, No. 10, pp. 3439-3443, Oct. 2009.
Gan, M., et al., "Calibration of indoor UWB sub-band divided ray tracing using multiobjective simulated annealing," in IEEE Int. Conf. Commun. (ICC), Sydney, NSW, Australia, Jun. 2014, pp. 4844-4849.
Charbonnier, R., et al., "Calibration of ray-tracing with diffuse scattering against 28-GHz directional urban channel measurements," IEEE Trans. Veh. Technol., vol. 69, No. 12, pp. 14 264-14 276, Oct. 2020.
Bhatia, G.S., et al., "Tuning of ray-based channel model for 5G indoor industrial scenarios," in IEEE Int. Mediterranean Conf. Commun. Network (MeditCom), Dubrovnik, Croatia, Sep. 2023, pp. 311-316.
Hoydis, J., et al., "Sionna RT: Differentiable Ray Tracing for Radio Propagation Modeling," arXiv preprint, Mar. 2023.
Kingma, D.P., et al., "Adam: A method for stochastic optimization," arxiv preprint arXiv:1412.6980, 2014.
Raissi, M., et al., "Physics-informed neural networks: A deep learning framework for solving forward an dinverse problems involving nonlinear partial differential equations," Journal of Computational physics, vol. 378, pp. 686-707, 2019.
Hoydis, J., et al., "Learning radio environments by differentiable ray tracing," Dec. 2023.
Fugen, T., et al., "Capability of 3D ray tracing for defining parameter sets for the specification of future mobile communications systems," IEEE Trans. Antennas Propag., vol. 54, No. 11, pp. 3125-3137, Nov. 2006.
Degli-Esposti, V., et al., "Measurement and modelling of scattering from buildings," IEEE Trans. Antennas Propag., vol. 55, No. 1, pp. 143-153, Jan. 2007.
Degli-Esposti, V., et al., "Analysis and modeling on co-and cross-polarized urban radio propagation for dual-polarized MOMO wireless systems," IEEE Trans. Antennas Propag., vol. 59, No. 11, pp. 4247-4256, Aug. 2011.
Deschamps, G.A., et al., "Ray techniques in electromagnetics," Proc. IEEE, vol. 60, No. 9, pp. 1022-1035, Sep. 1972.
Kouyoumjian, R.G., et al., "A uniform geometrical theory of diffraction for an edge in a perfectly conducting surface," Proc. IEEE, vol. 62, No. 11, pp. 1448-1461, Nov. 1974.
Luebbers, R., et al., "Finite conductivity uniform GTD versus knife edge diffraction in prediction of propagation path loss," IEEE TRans. Anennas Propag., vol. 32, No. 1, pp. 70-76, Jan. 1984.
Keller, J.B., et al., "Geometrical theory of diffraction," Journal of the Optical Society of America, vol. 52, No. 2, pp. 116-130, Feb. 1962.
Nicolet, B., et al., "Large steps in inverse rendering of geometry," ACM Trans. Graph., vol. 40, No. 6, Dec. 2021.
Meder, J., et al., "Hemispherical Gaussians for accurate light integration," in Proc. Int. Conf. Computer Vision and Graphics (ICCVG), Warsaw, Poland, Step. 2018, pp. 3-15.
Choromanska, A., et al., "The loss surfaces of multilayer networks," in Proc. Int. Conf. Artificial Intelligence and Statistics (PMLR), vol. 38, San Diego, CA, USA, May 9-12, 2015, pp. 192-204.
Mildenhall, B., et al., "NeRF: Representing scenes as neural radiance fields for view synthesis," Communications of the ACM, vol. 65, No. 1, pp. 1-6, Jan. 2021.
Tancik, M., et al., "Fourier features let networks learn high frequency functions in low dimensional domains," In Advances in Neural Information Processing Systems, vol. 33, Curran Associates, Inc., Aug. 2020, pp. 7537-7547.
Euchner, F., et al., A distributed massive MIMO channel counder for "Big CSI Data-driven machine learning," arXiv:2206.15302v1, Jun. 30, 2022.
Yun, R., et al., "Ray Tracing for Radio Propagation Modeling: Principles and Applications," IEEE Access, vol. 3, 2015, pp. 1089-1100.
ITU, "Recommendation ITU-R, P.2040-3: Effects of building materials and structures on radiowave propagation above about 100 MHz," Tech Rep., Aug. 2023.
ITU, "Recommendation ITU-R, P.526-15: Propagation by diffraction," Tech. Rep., Oct. 2019.
Euchner, F., et al., "dichasus-dcxx:Institute hallway with known 3D model, distributed antennas," https://dichasus.inue.uni-stuttgart.de/datasets/data/dichasus-dcxx/, Dec. 2023.
McKown et al., "Ray tracing as a design tool for radio networks," in IEEE Networlk, vol. 5, No. 6, pp. 27-30, Nov. 1991.
Sheikh et al., "Measurements and Ray Tracing Simulations: Impact of Different Antenna Positions on Meeting Room Coverage at 60 GHz," 2020 European Conference on Networlks and Communications (EuCNC), Dubrovnik, Croatia, pp. 63-67, 2020.
Rustako et al., "Radio propagation at microwave frequencies for line-of-sight microcellular mobile and personal communications," in IEEE Transactions on Vehicular Technology, vol. 40, No. 1, pp. 203-210, Feb. 1991.
Fugen et al., "Capability of 3-D Ray Tracing for Defining Parameter Sets for the Specification of Future Mobile Communications Systems," in IEEE Transactions on Antennas and Propagation, vol. 54, No. 11, pp. 3125-3137, Nov. 2006.
Christensen et al., "Ray differentials and multiresolution geometry caching for distribution ray tracing in complex scenes," Computer Graphics Forum. vol. 22. No. 3. Oxford, UK: Blackwell Publishing, Inc, 2003.

(56) References Cited

OTHER PUBLICATIONS

Chatterjee et al., “Convergence of gradient descent for deep neural networks,” arXiv preprint arXiv, Dec. 17, 2022.
Hou et al., “A new method for radio wave propagation prediction based on finite integral method and machine learning,” 2017 IEEE 5th International Symposium on Electromagnetic Compatibility (EMC—Beijing), Beijing, China, pp. 1-4, 2017.
Chang et al., “Propagation Analysis with Ray Tracing Method for High Speed Trains Environment at 60 GHz,” IEEE 81st Vehicular Technology Conference (VTC Spring), Glasgow, UK, pp. 1-5, 2015.
Lgehy, “Tracing ray differentials,” In Proceedings of the 26th annual conference on Computer graphics and interactive techniques (SIGGRAPH ’99). ACM Press/Addison-Wesley Publishing Co., USA, 179-186, 1999.

* cited by examiner

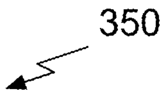

Compute, by a differentiable ray tracer, simulated radio characteristics for a 3D scene based on configured parameters and at least one trainable parameter corresponding to a scene property, where for each ray intersection point in the 3D scene, a neural component estimates the at least one trainable parameter
355

Update weights applied by the neural component to estimate the at least one trainable parameter using gradient-based optimization to minimize a loss function of the simulated radio characteristics and reference radio characteristics
360

*Fig. 3C*

NEURAL COMPONENTS FOR DIFFERENTIABLE RAY TRACING OF RADIO PROPAGATION

CLAIM OF PRIORITY

This application claims the benefit of U.S. Provisional Application No. 63/585,914 titled "Neural Components for Differentiable Ray Tracing of Radio Propagation," filed Sep. 27, 2023, the entire contents of which is incorporated herein by reference.

BACKGROUND

Digital twins are used in the telecommunications industry to simulate physical environments for network planning and operations. Today ray tracing may be used to simulate such physical environments based on scene geometry and electromagnetic material (EM) properties (scene properties) which may be assigned to objects in the scene. The scene properties of interest to the simulation of wireless propagation include at least one of the relative permittivity, conductivity, and permeability of the objects, as well as effective roughness, and scattering functions. Also, at least one of the configurations of meta materials, such as reconfigurable intelligent surfaces (RIS), as well as antenna patterns, orientations, and positions are important scene properties that may be of interest. While algorithms for accurate scene geometry reconstruction are widely available, obtaining the EM-specific scene properties of objects may be challenging. There is a need for addressing these issues and/or other issues associated with the prior art.

SUMMARY

Embodiments of the present disclosure relate to neural components for differentiable ray tracing of radio propagation. Systems and methods are disclosed that use differentiable ray tracing to refine the scene geometry of the physical environment (i.e., the shape and position of scene objects), to learn or optimize the scene properties of objects in the scene, to learn or optimize the scene properties of meta materials, such as reconfigurable intelligent surfaces (RIS), and to learn or optimize antenna patterns, array geometries, and orientations and positions of transmitters and receivers. The scene properties of interest to the simulation of wireless propagation include at least one of the positions, geometry, relative permittivity, reflection coefficients, transmission coefficients, conductivity, and permeability of the objects, as well as effective roughness, scattering, and diffraction functions. Once scene properties have been learned or optimized, the differentiable ray tracer may further be used to simulate radio wave propagation to simulate the performance of different configurations of the transmitters, receivers, and scene geometry. In an embodiment, one or more of the scene geometry, scene properties, and antenna characteristics are computed by a differentiable parametric function, such as a neural network, and parameters of the differentiable parametric function are learned using the differentiable ray tracing.

Once scene properties have been learned or optimized, the differentiable ray tracer may further be used to simulate radio wave propagation to simulate the performance of different configurations of the scene geometry and radio devices, such as the antennas. In an embodiment, one or more of the scene geometry, scene properties, and antenna characteristics are computed by a differentiable parametric function, such as a neural network, etc. and parameters of the differentiable parametric function are learned using the differentiable ray tracing.

While algorithms for accurate scene geometry reconstruction are widely available, obtaining the EM-specific scene properties of objects may be challenging. A spatially consistent correspondence between a physical location in a scene and the channel impulse response (CIR) is needed for simulation of specific radio environments. In contrast with conventional stochastic channel models, a differentiable ray tracer for radio propagation modeling allows for the computation of gradients of the CIR and other scene properties with respect to many system and scene properties, enables gradient descent-based training of the CIR and the other scene properties.

In an embodiment, the method includes computing, by a differentiable ray tracer, simulated radio characteristics for a three-dimensional (3D) scene based on configured parameters and at least one trainable parameter corresponding to a scene property, where for each ray intersection point in the 3D scene, a neural component estimates the at least one trainable parameter. Weights applied by the neural component to estimate the at least one trainable parameter are updated using gradient-based optimization to minimize a loss function of the simulated radio characteristics and reference radio characteristics. In an embodiment, the 3D scene is a digital twin of a physical environment.

BRIEF DESCRIPTION OF THE DRAWINGS

The present systems and methods related to neural components for differentiable ray tracing of radio propagation are described in detail below with reference to the attached drawing figures, wherein:

FIG. 3C illustrates a flowchart of a method for learning scene parameters by ray tracing of radio propagation, in accordance with an embodiment.

DETAILED DESCRIPTION

Systems and methods are disclosed related to neural components for differentiable ray tracing of radio propagation. Differentiable ray tracing may be used to refine the scene geometry of a physical environment, to learn or optimize the scene properties of objects in the scene, to learn or optimize the scene properties of antennas, and to learn or optimize antenna patterns, array geometries, and orientations and positions of transmitters and receivers. Transmitters and receivers are implemented using antennas. Once scene properties have been learned or optimized, the differentiable ray tracer may further be used to simulate radio wave propagation to simulate the performance of different configurations of the antennas and scene geometry. In an embodiment, one or more of the scene geometry, scene properties, and antenna characteristics are computed by a differentiable parametric function, such as a neural network, etc. and parameters of the differentiable parametric function are learned using the differentiable ray tracing.

Figure 1A:
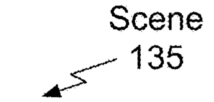
FIG. 1A illustrates a simulated scene for learning radio materials, in accordance with an embodiment.
Figure 1A:
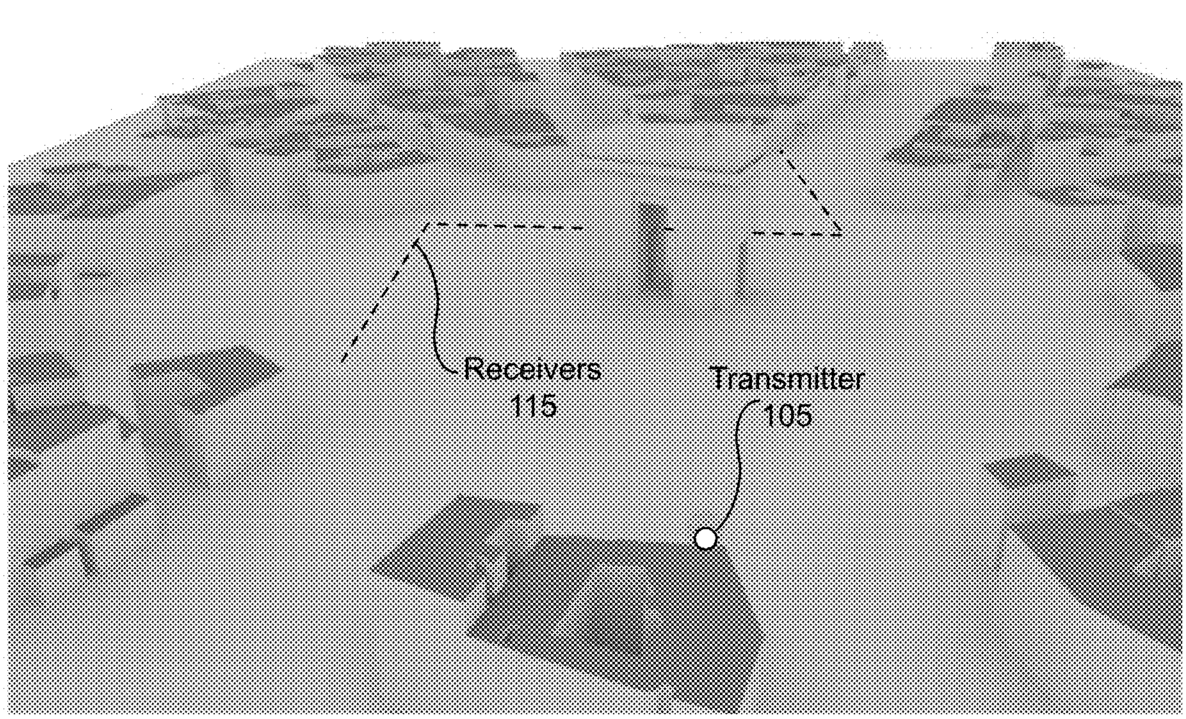

FIG. 1A illustrates a simulated scene 140 for learning scene properties, in accordance with an embodiment. A transmitter 105 is located on a roof of a structure and four hundred receivers 115 are positioned along a path (dashed segments). In an embodiment, positions of the transmitter 105 and receivers 115 are defined by yaw, pitch, and roll angles. In an embodiment, all transmitters and all receivers in a scene have the same antenna array configurations. For example, all transmitters may be equipped with an 8×2 dual-polarized array, while all receivers have a single cross-polarized antenna. In an embodiment, antenna arrays are composed of multiple identical antennas. In an embodiment, antennas can have custom or predefined patterns and are either single- or dual-polarized. In an embodiment, antennas of an array can have arbitrary relative positions as well as user-defined and preconfigured radiation patterns.

In an embodiment, scene geometries are obtained from conventional building databases. In an embodiment, the initial scene geometry is obtained from images of the scene, using e.g., neural radiance fields combined with marching cubes or other 3D reconstruction techniques. The scene geometry may be provided as triangle meshes, signed distance functions, or any other representation. However, there is no straightforward process for obtaining the material properties, such as permittivity, conductivity, permeability, roughness, and scattering functions, for the objects in the scene 140. The material properties may be initialized to random values. In an embodiment, initial values of the material properties are extracted from images of the physical environment corresponding to the scene 140 by detecting material types based on appearance and then choosing the associated material properties from a look-up table. Object materials in the scene 140 include concrete for the streets, marble for building walls, metal for roofs, and wood for a ceiling of the underside of an arch. In an embodiment, the EM or radio properties for the materials include relative permittivity ε, conductivity 6, and several parameters related to scattering (scattering coefficient, pattern, cross polarization discrimination). In an embodiment, the materials are defined by frequency-dependent functions.

A ray tracing process is executed to compute propagation paths between all transmitters and receivers. In an embodiment, a maximum number of interactions between a ray and scene objects may be defined. For example, for a maximum of zero interactions, only line-of-sight (LoS) paths that fail to interact with the scene between the transmitter and receiver are considered. In an embodiment, different propagation phenomena such as diffraction and scattering can be additionally enabled. In an embodiment specular and diffuse reflections (i.e., scatter), as well as first-order diffraction can be modeled. Reference channel characteristics needed to train a radio propagation model are computed at known locations using the scene geometry, transmitter and receiver characteristics, and standard radio material properties defined by an organization such as the International Telecommunications Union (ITU). The channel characteristics describe quantitatively how an EM wave sent by a transmitter is received by a receiver at specific locations within the scene. The channel characteristics comprise at least one of a channel impulse response (CIR), a channel frequency response, a path delay, an angle of arrival or departure, an amplitude, a power level, a delay spread, a doppler spread, or a number of paths. In an embodiment, the reference channel characteristics are provided. In an embodiment, the reference channel characteristics are measured in the physical environment. In an embodiment, the reference channel characteristics are generated by simulation. In an embodiment, the reference channel characteristics are computed by an integral solver.

Antenna arrays can be either explicitly modeled, i.e., propagation paths are traced for every antenna element, or modeled synthetically after the ray tracing process by making a plane-wave assumption across the array. The former option is preferable for very large aperture arrays, where the plane-wave assumption does not hold. The latter option is significantly faster, especially in large scenes. In an embodiment, antenna arrays are explicitly modeled by finding paths between any pair of transmitting and receiving antennas in the scene. In an embodiment, arrays are represented by a single antenna located at the center of the array. Phase shifts related to the relative antenna positions will then be applied based on a plane-wave assumption when the channel characteristics are computed.

Once the propagation paths are determined via the ray tracing process, the propagation paths can be transformed into channel characteristics. Temporal evolution of the channel characteristics can be simulated based on arbitrary velocity vectors of all transmitters and receivers. Furthermore, a coverage map may be generated which can be visualized together with the propagation paths. The resulting simulated channel characteristics can also be used for link-level simulations in either time or frequency domains. Once a reference data set of channel characteristics for the scene 100 are generated using the scene properties initialized to default values, at least one of the scene properties may be replaced with trainable parameters. Differentiable ray tracing allows the optimization of the trainable scene properties using gradient-based learning techniques.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
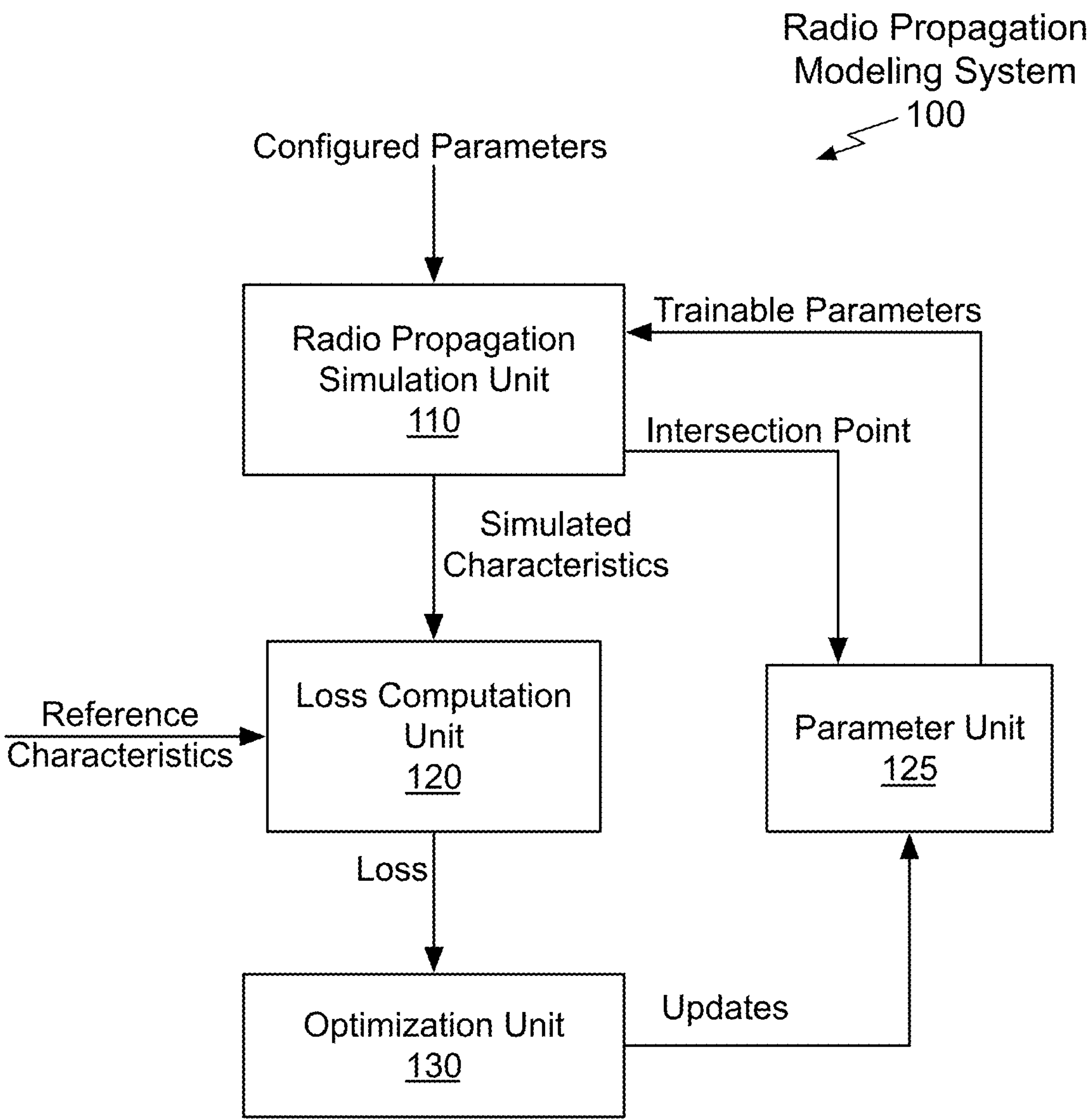
FIG. 1B illustrates a block diagram of an example radio propagation modeling system suitable for use in implementing some embodiments of the present disclosure.

FIG. 1B illustrates a block diagram of an example radio propagation modeling system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the radio propagation modeling system 100 is within the scope and spirit of embodiments of the present disclosure.

The radio propagation modeling system 100 includes a radio propagation simulation unit 110, a loss computation unit 120, an optimization unit 130, and a parameter unit 125. In an embodiment, the radio propagation simulation unit 110 receives the scene geometry and characteristics of the transmitter and receivers as configured (fixed) parameters and learns trainable parameters, specifically, radio material properties (scene properties) are learned. In other embodiments, at least one of the radio material properties is learned along with any number of the scene properties, including the scene geometry. During training one or more of the object locations, orientations, shapes, scales, surface normal vectors, object-wide rotation, and object translation may be trainable parameters that are updated during training. In an embodiment, the trainable parameters are optimized to achieve a design objective. In an embodiment, the trainable parameters are optimized by using gradient descent to minimize a loss function, such as minimizing a normalized mean squared error between reference characteristics (e.g., channel frequency responses or CIRs) and simulated characteristics computed by the radio propagation simulation unit 110 based on a combination of the configured and trainable parameters. The parameter unit 125 initializes and updates at least one of the trainable parameters. A radio propagation simulation unit 110 receives the configured parameters and the trainable parameters. The radio propagation simulation unit 110 performs differentiable ray tracing using the configured and trainable parameters to produce simulated radio characteristics. In an embodiment, the simulated characteristics are CIRs at one or more positions in the scene. In an embodiment, the trainable parameters include a scattering pattern for non-specular reflection that is learned.

As previously described, reference characteristics may be measured in the physical environment or computed by the radio propagation simulation unit 110 using initial values for all of the parameters, such that all of the parameters are configured parameters and none are trainable. After the reference characteristics are acquired, the radio propagation modeling system 100 may be used to learn the trainable parameters.

A loss computation unit 120 receives the simulated characteristics and the reference characteristics and computes a loss representing differences between the reference and simulated characteristics. In an embodiment, the loss computation unit 120 also uses the trainable parameters as regularization terms. The optimization unit 130 processes the loss according to a gradient-based optimization algorithm (such as gradient descent or deterministic, stochastic, or heuristic techniques) to generate updates for the trainable parameters intended to reduce the differences. In an embodiment, the optimization unit 130 uses other optimization algorithms to generate the updates. In an embodiment, the optimization unit 130 computes the gradients. In an embodiment, the optimization unit 130 receives the gradients.

In an embodiment, the loss is computed using a loss function such as (normalised) mean squared error, (normalised) mean absolute error, symmetric mean absolute percentage error, or a weighted sum of multiple losses. The loss function may have regularization terms that depend on the material properties or scene geometry. Computation of the loss function can involve the transformation of the simulated characteristics to metrics of interest for which the loss is computed. Examples of the simulated characteristics include the absolute received power (in linear or logarithmic scale), delay and angular spread, CIR, channel frequency response, power-angular-delay profile. In an embodiment, computation of the loss function also involves one or more of the scene properties directly, not only the simulated characteristics. For example, in an embodiment, the loss function maximizes the received power while minimizing the geometric area of an RIS.

Because gradients (updates) can be computed for any of the parameters, once the radio propagation simulation unit 110 is trained (calibrated) for a particular environment (scene), the calibrated radio propagation simulation unit 110 can then be used to optimize one or more parameters to achieve desired characteristics. Examples of desired characteristics include an antenna pattern, coverage, spectral efficiency, and energy efficiency. Alternatively or in addition, the scene geometry may be optimized to achieve the desired characteristics. In an embodiment, the antenna pattern is defined by a directional gain and a polarization slant angle.

In an embodiment, the radio propagation simulation unit 110 simulates EM wave propagation by considering specular reflections at the surfaces of the objects within the simulated environment. In an embodiment, the propagation paths of the EM waves are generated using the image method, i.e., an exhaustive search of all paths formed by the specular reflections. It is also possible to find paths formed by specular reflections using heuristic methods, such as shoot-and-bounce. The channel frequency response for a given pair of locations for EM devices, such as transmitters and receivers, is computed as:

$$h(f) = \sum_{i=1}^{N} = \sqrt{\left(\frac{\lambda}{4\pi}\right)^2 G_T G_R} \begin{bmatrix} C_{R,\theta}\left(\theta_R^{(i)}, \varphi_R^{(i)}\right) \\ C_{R,\varphi}\left(\theta_R^{(i)}, \varphi_R^{(i)}\right) \end{bmatrix}^T T^{(i)} \begin{bmatrix} C_{T,\theta}\left(\theta_T^{(i)}, \varphi_T^{(i)}\right) \\ C_{T,\varphi}\left(\theta_T^{(i)}, \varphi_T^{(i)}\right) \end{bmatrix} \frac{e^{-j2\pi f \tau^{(i)}}}{d^{(i)}}, \quad \text{Eq. (1)}$$

where f is the frequency,

N is the number of paths, $\lambda$ is the wavelength $G_R$ is the receive antenna gain, $G_T$ is the transmit antenna gain, $[C_{R,\theta}(\theta,\varphi), C_{R,\varphi}(\theta,\varphi)]^T$ is the receive vector antenna pattern, $[C_{T,\theta}(\theta,\varphi), C_{T,\varphi}(\theta,\varphi)]^T$ is the transmit vector antenna pattern, $$(\theta_R^{(i)}, \varphi_R^{(i)})$$

is the angle of arrival for the $i^{th}$ path, $$(\theta_T^{(i)}, \varphi_T^{(i)})$$

is the angle of departure for the $i^{th}$ path, $\tau^{(i)}$ is the propagation delay for the $i^{th}$ path, $d^{(i)}$ is the propagation distance for the $i^{th}$ path, and $T^{(i)}$ is the end-to-end transfer matrix for the $i^{th}$ path.

Given geometry and locations of the EM devices, the image method can generate a set of N paths, and for each path $i \in \{1, \ldots, N\}$ the total propagation distance $d^{(i)}$, the sequence of $M^{(i)}$ intersected objects, and, for each intersection, the intersection point. The propagation delay can be computed from the propagation distance as:

$$\tau^{(i)} = \frac{d^{(i)}}{c}, \qquad \text{Eq. (2)}$$

where c is the speed in air. The end-to-end transfer matrix can be computed as:

$$T^{(i)} = \prod_{m=0}^{M^{(i)}} D_{m+1}^{(i)} T_m^{(i)}, \qquad \text{Eq. (3)}$$

where $$D_{m+1}^{(i)}$$

is the change of basis matrix for going from the coordinate system used for describing the $m^{th}$ reflection to the coordinate system used for describing the $(m+1)^{th}$ reflection. The change of basis matrix can be computed from the intersection points generated by the image method.

The transfer matrix describing the mth reflection is:

$$T_m^{(i)} = \begin{bmatrix} R_{eTE,m}^{(i)} & 0 \\ 0 & R_{eTM,m}^{(i)} \end{bmatrix}, \qquad \text{Eq. (4)}$$

where $$R_{eTE,m}^{(i)}$$

is the reflection coefficient for the transverse electric (TE) component, and $$R_{eTM,m}^{(i)}$$

is the reflection coefficient for the transverse magnetic (TM) component.

The reflection coefficients can be computed as:

$$R_{eTE} = \frac{\cos\theta_m^{(i)} - \sqrt{\eta_m^{(i)} - \sin^2\theta_m^{(i)}}}{\cos\theta_m^{(i)} + \sqrt{\eta_m^{(i)} - \sin^2\theta_m^{(i)}}} \qquad \text{Eq. (5)}$$

and $$R_{eTE} = \frac{\eta_m^{(i)}\cos\theta_m^{(i)} - \sqrt{\eta_m^{(i)} - \sin^2\theta_m^{(i)}}}{\eta_m^{(i)}\cos\theta_m^{(i)} + \sqrt{\eta_m^{(i)} - \sin^2\theta_m^{(i)}}}, \qquad \text{Eq. (6)}$$

where the incident wave is assumed to propagate in air, $$\theta_m^{(i)}$$

is the angle of incidence, and $$\eta_m^{(i)} \in \mathbb{C}$$

is the complex relative permittivity of the medium upon which the wave is incident. The angles of incidence are computed from the intersection points generated by the image method. The relative permittivity of the intersected materials are generally the EM properties specific to each material on the objects constituting the environment. The complex relative permittivity is defined as $$\eta = \varepsilon_r - j\frac{\sigma}{\varepsilon_0 2\pi f}$$

where $\varepsilon_r$ is the real-valued relative permittivity, $\varepsilon_0$ is the vacuum permittivity, and $\sigma$ is the conductivity of a material. A formulation for transmission coefficients for rays that are refracted (i.e., that penetrate into a material) exists that is analogous to equations (5) and (6) for the reflection coefficients. In an embodiment, rather than learning the material properties (e.g., $\eta$, $\sigma$, etc.) the reflection and/or transmission coefficients (parameterized by the angle of incidence or departure) may be learned.

In an embodiment, each object forming the simulated environment can be assigned a relative permittivity following standard models from the international telecommunication union (ITU), such as brick, concrete, glass, or wood, to generate a dataset $\mathcal{D} = \{(h_\ell, p_\ell)\}_{\ell=1,\ldots,L}$ of L=1000 CIRs $h_\ell$ computed using equation (1) for a given frequency and with corresponding locations $p_\ell$ of the EM devices within the simulated environment. Such a dataset of CIRs and corresponding locations can be used as reference characteristics in lieu of measured CIRs at the same known locations.

In an embodiment, an example training procedure for learning trainable scene properties is shown in TABLE 1.

TABLE 1

| Example training procedure |
|---|
| Require: $\mathcal{D} = \{(h_\ell, p_\ell)\}_{\ell=1,\ldots,L}$ |
| Require: Scene geometry $\mathcal{G}$ |
| Require: Antenna configuration (patterns, orientations) |
| 1: Initialize the trainable relative permittivities $\eta$, e.g., randomly |
| 2: repeat |

TABLE 1-continued

| Example training procedure |
| --- |
| 3: Sample a batch of CIRs $h_l$ and corresponding locations $p_l$ |
| 4: Generate synthetic CIRs $f_\eta$ ($p_l$) for every location $p_l$ and for the relative permit-tivities $\eta$, the scene geometry $\mathcal{G}$, and the antenna configuration |
| 5: Compute the loss function, e.g., the mean square error (MSE) (7) |
| 6: Update $\eta$ using an optimization algorithm, e.g., gradient descent |
| 7: until some stop criterion is met |

Differentiable ray tracing performed by the radio propagation simulation unit 110 may be used to recover unknown EM properties of materials. For example, the relative permittivities of the objects forming the environment may be recovered given the reference characteristics $\mathcal{D}$. Therefore, once $\mathcal{D}$ has been generated, the relative permittivities $\eta$ of the EM materials can be treated as trainable variables that are initialized (line 1) according to one or more algorithms, for example, a random Gaussian distribution.

Because equation (1) is differentiable with respect to the relative permittivities $\eta$ of the materials, a gradient descent algorithm can be performed to minimize differences between the CIRs generated by the radio propagation simulation unit 110 (line 4) using the trainable relative permittivities and the permittivities for the reference CIRS from $\mathcal{D}$ (line 3), for the same locations of the EM devices. As shown in line 5, the loss function is MSE as an example loss function:

$$MSE_{(\eta)} = \frac{1}{L}\sum_{\ell=1}^{L} |h_\ell - f_\eta(p_\ell)|^2, \quad \text{Eq. (7)}$$

where $\eta$ is the vector of trainable relative permittivities, and $f_\eta(p)$ is the function evaluated by the radio propagation simulation unit 110 that computes a CIR for locations p given an environment geometry and trainable relative permittivities $\eta$. Other loss functions can be used. For example, assuming that paths can be resolved in the delay-domain with sufficient precision, the MSE between the individual path reflection coefficients may be considered as loss function. The stop criterion (line 7) may be a fixed number of iterations or a criteria threshold is satisfied.

When the radio propagation simulation unit 110 is trained to learn the trainable parameters (set of scene properties) using the algorithm in TABLE 1, the simulated characteristics converge to closely match the reference characteristics. In contrast, when the same set of scene properties are randomly initialized and not trainable, the simulated characteristics do not closely match the reference characteristics because knowledge of the scene geometry alone is not sufficient to accurately simulate radio propagation.

In an embodiment, rather than modeling the scene geometry and learning the scene properties of the geometry directly, one or more of the trainable parameters or scene properties may be learned indirectly using an over-parameterization. Conventional techniques associate the scene properties with specific scene geometry (objects or object parts), for example, relying on large lookup tables accessed using identifiers of mesh-based geometry of surfaces hit by a ray. Discretization of the scene has two difficulties. First, the number of materials that need to be calibrated can become very large. Second, the process of discretizing a scene into objects or parts of objects sharing the same material cannot be easily automated. For this reason, a different approach is needed that does not require discretization, is easy to implement and calibrate, and can, in principle, scale to arbitrarily large scenes. Neural materials may provide such an approach. In contrast with conventional techniques, during ray tracing of the scene, when neural materials are used, trainable vectors are learned for hit point coordinates and the trainable vectors are then used to compute at least some of the trainable parameters. In an embodiment, one or more of the trainable parameters are directly learned.

In an embodiment, a radio material is described by four properties, the conductivity $\sigma \geq 0$, the relative permittivity $\varepsilon_r \geq 1$, a scattering coefficient $S \in [0,1]$, and a cross polarization discrimination (XPD) coefficient $K_x \in [0,1]$. The XPD determines how much energy is transferred into the orthogonal polarization direction after a diffuse reflection. Each material has a scattering pattern $f_s$ that describes, similar to an antenna pattern, the directivity of the scattered field.

Although one could immediately consider the properties as directly trainable, indirectly training the properties using an over-parametrization helps avoid local minima during gradient-based optimization. The following model may be used:

$$\sigma = e^{v^\top w_1} \quad \text{Eq. (8)}$$

$$\varepsilon_r = 1 + e^{v^\top w_2} \quad \text{Eq. (9)}$$

$$S = \text{sigmoid}(v^\top w_3) \quad \text{Eq. (10)}$$

$$K_x = \text{sigmoid}(v^\top w_4) \quad \text{Eq. (11)}$$

where $\text{sigmoid}(x)=1/(1+e^{-x})$, $v \in \mathbb{R}^L$, and $w_i \in \mathbb{R}^L$ for I=1 . . . , 4, are trainable vectors in L dimensions. The read-out vector v is used to convert the embeddings $w_i$, to scalar values. As $\sigma$ and $\varepsilon_r$ need to cover a very large range of values, in an embodiment, they are represented in the logarithmic domain.

In an embodiment, the trainable parameters corresponding to scene properties are learned by a neural component with trainable weights, such as a multilayer perceptron (MLP), that takes as input a positional encoding of the intersection point of a ray with a scene object (or a proxy, or simplified representation of the object, such as a surface enclosing the object) and outputs scene properties, such as the conductivity and relative permittivity, for the intersection point. The trainable parameters are not necessarily limited to $\varepsilon_r$, $\sigma$, S, and $K_x$, but may also comprise the computation of the weights and concentration parameters of the scattering pattern of the materials among other properties. The intersection point is provided by the radio propagation simulation unit 110.

Figure 1C:
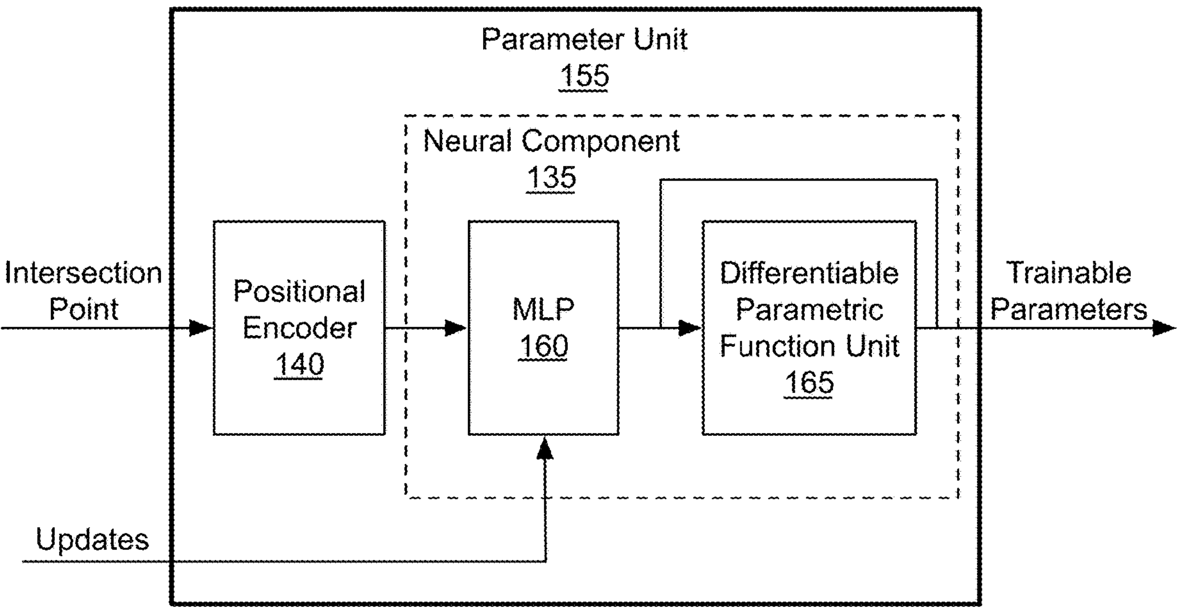
FIG. 1C illustrates a block diagram of an example parameter unit suitable for use in implementing some embodiments of the present disclosure.

FIG. 1C illustrates a block diagram of an example parameter unit 155 suitable for use in implementing some embodiments of the present disclosure. In an embodiment, the parameter unit 155 comprises the parameter unit 135. In one embodiment, at least one of the scene properties is generated by a neural component 135 comprising an MLP 160 with trainable weights and a differentiable parametric function unit 165. Weights of the MLP 160 may be updated by the optimization unit 130. The MLP 160 implicitly learns a material-based segmentation of the scene without requiring knowledge of the scene geometry. The neural component 135 takes as input a positional encoding of the intersection point of a ray with a scene object and outputs scene properties, such as the conductivity and relative permittivity, for the intersection point. In an embodiment, the intersection point is (x, y, z) coordinates in 3D space.

Rather than having the neural component 135 operate directly on the input coordinates of the intersection point $p=[x, y, z]^T \in \mathbb{R}^3$, a positional encoder 140 performs a positional encoding $$\gamma(p) = [\sin(2\pi p), \cos(2\pi p), \ldots, \sin(2^L \pi p), \cos(2^L \pi p)] \quad \text{Eq. (12)}$$

that is separately applied to each coordinate. Input encoding enables the neural component 135 to better represent functions with high frequency components over low-dimensional domains. The parameter L controls how fast material properties can vary across space, where a larger value of L enables higher frequency materials and L=0 corresponds to a scene with a single material. In an embodiment, to make the positional encoding unique, the input coordinates are transformed to the unit cube:

$$\overline{p} = \frac{p - b}{\Delta_b} \quad \text{Eq. (13)}$$

where $\Delta_b \in \mathbb{R}$ is the maximum side length and $b \in \mathbb{R}^3$ the center of the axis-aligned bounding box (AABB) of the scene, which defines the smallest bounding box that encloses all objects in the scene and has edges parallel to the coordinate axes. The normalized and encoded coordinates $\gamma(\overline{p}) \in \mathbb{R}^{6L}$ output by the positional encoder 140 are fed into the neural component 136 which has one output for each trainable parameter. In an embodiment, the positional encoder 140 comprises a multiresolution hash grid encoding.

In an embodiment, the MLP 160 outputs the variables (embedding vector $w_i$) of the differentiable parametric functions which are used with the read-out vector v to compute the scene properties. The outputs are then transformed by the differentiable parametric function unit 165 using the equations (8), (9), (10), and (11). In an embodiment, the read-out vector is shared by multiple scene properties and is therefore, learned directly rather than by the MLP 160. In an embodiment, the embedding vector and the read-out vector are represented in L dimensions. In an embodiment, a CFR (channel frequency response) scaling factor is iteratively estimated rather than learned.

In one embodiment, the neural component 135 generates an output that relates to an additional phase shift that is applied to an incoming ray, such as an output $\Delta \in [-1,1]$. The phase shift $\varphi_\Delta$ is then computed as $\varphi_A = \pi \Delta n^T k_i$, where $n \in \mathbb{R}^3$ is the surface normal at the intersection point of the ray with a scene object and $k_i \in \mathbb{R}^3$ is the direction of the incoming ray. In an embodiment, the phase shifts compensate for small mismatches in the scene geometry.

In an embodiment, the optimization unit 130 computes the following per-sample loss $$\mathcal{L} = l(\tau_{RMS}, \hat{\tau}_{RMS}) + l(P, \hat{P}) \quad \text{Eq. (14)}$$

where

-continued $$l(x, y) = \frac{|x - y|}{x + y} \in [0,1] \quad \text{Eq. (15)}$$

is the symmetric mean absolute percentage error (SMAPE), $$\tau_{RMS} = \sqrt{\sum_l \left(\frac{l - \overline{\tau}}{W}\right)^2 \frac{p_l}{P}} \quad \text{Eq. (16)}$$

is the root mean square (RMS) delay spread with $$\tau = \sum_l l \frac{p_l}{p} \text{ and } p_l = |h[l]|^2,$$

and P is the total channel gain:

$$P = \sum_l p_l. \quad \text{Eq. (17)}$$

The values $\hat{P}$ and $\hat{\tau}_{RMS}$ are obtained from ray traced CIRs, while P and $\tau_{RMS}$ are obtained from measurements. The intuition behind the loss in equation (14) is that the first term measures differences in the delay distribution of the relative path powers while the second term measures differences in the absolute power. As the loss is typically computed over a batch of measurements taken at different positions in a scene, the normalization in equation (15) ensures that all samples are given equal importance. Without the normalization, the calibration procedure would focus on areas with strong channels, leading to poor performance in areas of weak coverage. A reason to use this loss over alternatives, such as the power-angular-delay spectrum, is that both the root mean square (RMS) delay spread and absolute power are agnostic to time offsets which may be present in the dataset. However, alternative losses may be used as drop-in replacements for calibration with other measurements when time offsets are not present in the dataset.

A particularity of the channel measurements is that no absolute power reference is known. This means that all examples of the measured dataset are scaled by a common but unknown value $\alpha \in \mathbb{R}$. In order to find a suitable scaling parameter, a is estimated iteratively by an exponentially moving average (EMA) during the calibration process:

$$\alpha_i = \delta\alpha_{i-1} + (1 - \delta)\hat{\alpha}_i \quad i = 1, 2, \ldots \quad \text{Eq. (18)}$$

where B is the batch size, $\delta > 0$ the decay parameter, $\alpha_0 = \hat{\alpha}_1$, and $\hat{\alpha}_i$, is computed as $$\hat{\alpha}_i = \underset{\alpha}{\operatorname{argmin}} \frac{1}{B} \sum_{b=1}^{B} (\alpha P_b - \hat{P}_b)^2 = \frac{\sum_b P_b \hat{P}_b}{\sum_b P_b^2}. \quad \text{Eq. (19)}$$

In the limit, $\alpha_i$ is expected to be close to the scaling parameter that solves equation (19) for the entire dataset. Computing the latter at every iteration would be too costly. In an embodiment, a scaling factor is learned via gradient descent.

Figure 2A:
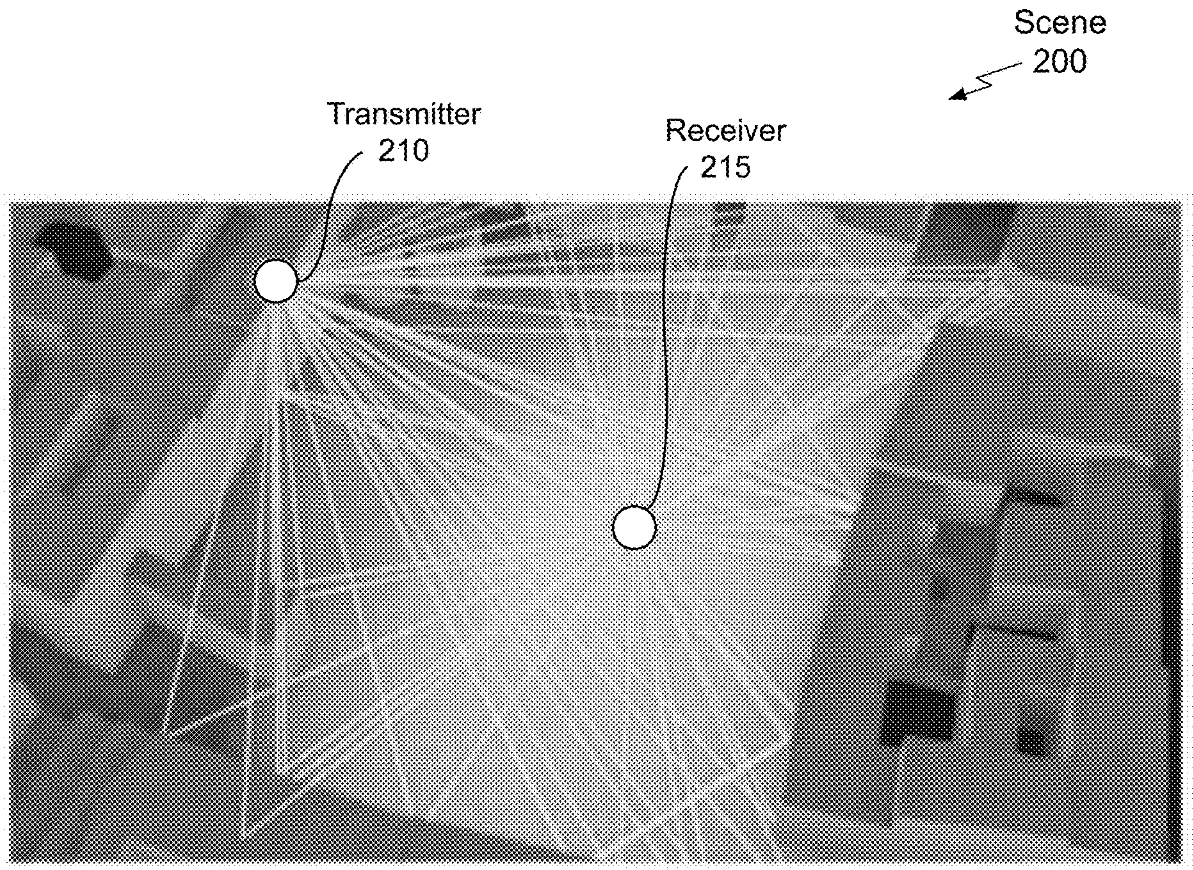
FIG. 2A illustrates a visualization of a coverage map with paths, in accordance with an embodiment.

FIG. 2A illustrates a visualization of a coverage map with paths, in accordance with an embodiment. A scene 200 includes multiple buildings with a transmitter 210 located on top of one building and oriented towards a receiver 215 positioned in an open space between the buildings. The radio propagation paths (for specular reflections) are traced between the transmitter 210 and the receiver 215 by the radio propagation simulation unit 110 and shown as white lines. The path gain (ranging from −120 dB to 60 dB) represents visualization of the coverage and is shown as a lighter color shading (light gray to white) for 60 dB and darker color shading (gray to dark gray) for lower path gain. The coverage may be computed from the simulated characteristics or may be computed directly by the radio propagation simulation unit 110.

Figure 2B:
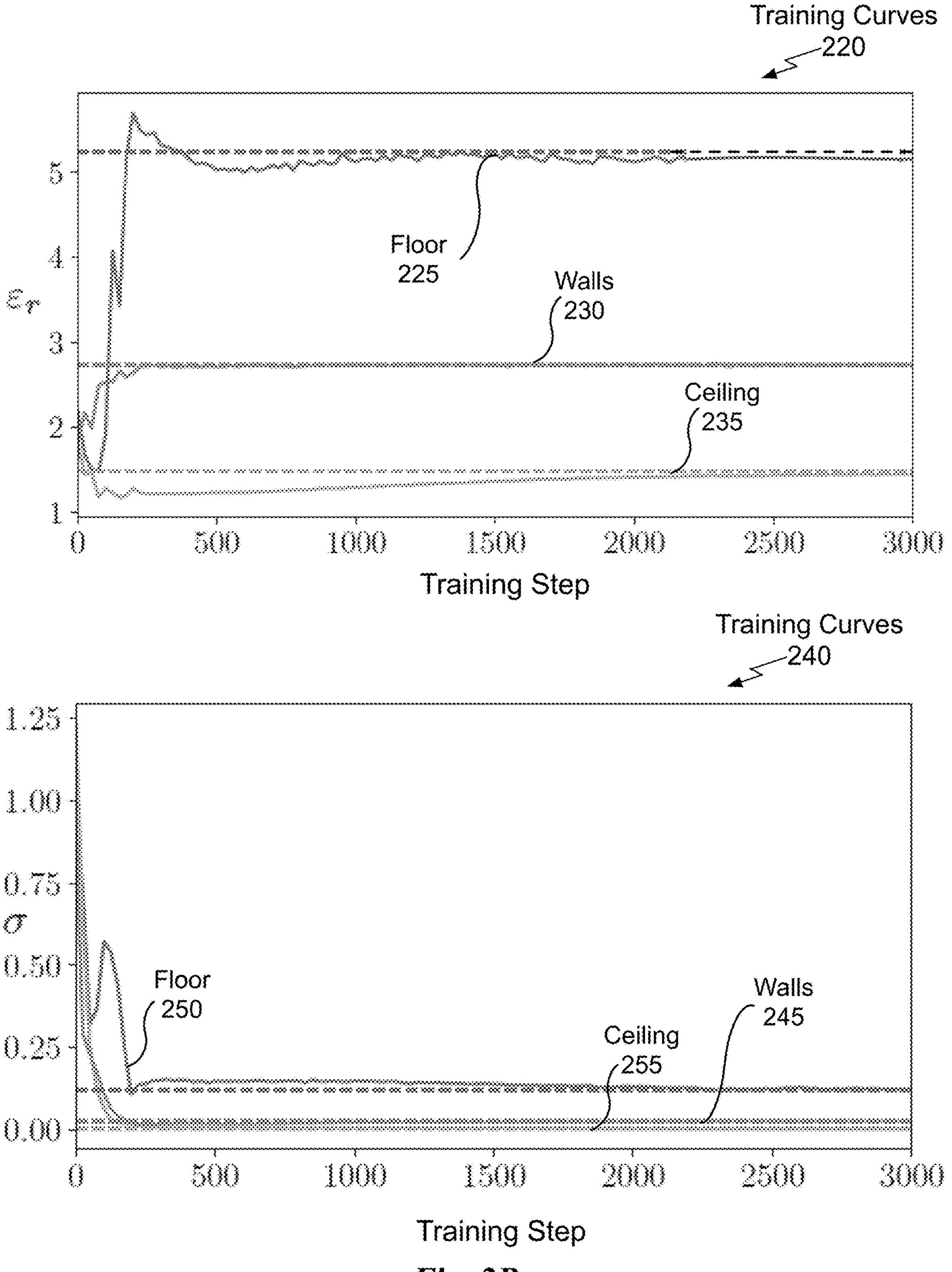
FIG. 2B illustrates training curves for scene parameters suitable for use in implementing some embodiments of the present disclosure.

FIG. 2B illustrates training curves 220 and 240 for scene parameters suitable for use in implementing some embodiments of the present disclosure. The training curves 220 and 240 are associated with an indoor scene having antenna panels at opposing ends of a corridor with a remotely operating transmitter that navigates the corridor along a pseudo-random path. The indoor scene is characterized by composite walls of drywall, glass, and metal, a ceiling half-covered by a metal grid, and a sizable magnetic board in an entrance hall. Dashed and solid lines represent reference values (ground truth) and learned values, respectively. All parameters can be nearly perfectly recovered within 3000 training steps (iterations). The curves for floor 225, walls 230, and ceiling 235 are associated with the learned relative permittivity trainable parameters of different materials and each curve converges to the respective reference values (ground truth) during training.

A scene may be calibrated using stochastic gradient descent (SGD) on the loss w.r.t. to all trainable parameters of the materials, antenna and scattering patterns, as previously described, and which we denote by Ω. It is assumed that a reference dataset of D CIRs $h_d$ together with their associated positions $p_d$ is available. The algorithm starts by randomly initializing all trainable parameters Ω. It then iteratively computes the scaling factor $\alpha_i$ and the ray tracing predictions $\hat{h}_b = RT(p_b; \Omega)$ for a random batch of B examples and uses the gradient of the average loss over the batch to update the parameters until convergence. Algorithm 1 shown in TABLE 2 provides a formal description of an example training procedure using vanilla SGD with a learning rate beta for the sake of compactness. Note that any other SGD-variant might be used as well.

TABLE 2

| Example training procedure |
|---|
| Algorithm 1: Gradient-based Scene Calibration |
| Input: B, δ, β |
| Data: $(h_d, p_d)$ for d E $\mathcal{D} = \{1, \ldots, D\}$ |
| 1 Randomly initialize all trainable parameters Ω |
| 2 i ← 1 |
| 3 repeat |
| 4 \| Draw random batch of B examples $\mathcal{B} \subseteq \mathcal{D}$ |
| 5 \| Compute $\alpha_i$ as in (42) |
| 6 \| for b E $\mathcal{B}$ do |
| 7 \| \| $h_b \leftarrow \sqrt{\alpha_i}\, h_b$ |
| 8 \| \| $\hat{h}_b \leftarrow RT(p_b; \Omega)$ |
| 9 \| \| Compute sample loss $\mathcal{L}_b$ as in (38) |
| 10 \| end |
| 11 \| $\mathcal{L} = \frac{1}{B}\sum_b \mathcal{L}_b$ |
| 12 \| $\Omega \leftarrow \Omega - \beta\nabla_\Omega \mathcal{L}$ |
| 13 \| i ← 1 + 1 |
| 14 until convergence; |

In addition to materials, antenna patterns and scattering patterns may be trained. Antenna patterns are square integrable functions on a sphere that need to satisfy a normalization constraint. A parametric model for a trainable antenna pattern is described that is a square integrable function on the sphere and satisfies a normalization constraint. In an embodiment, antenna patterns are defined by their directional gain and polarization slant angle ζ, where ζ=0 and ζ=π/2 correspond to vertical and horizontal polarization, respectively. In an embodiment, trainable directional gains G (θ,φ) from which the antenna pattern for the vertical and horizontal polarization, respectively, can be computed according to $$C(\theta, \varphi) = \left[\cos(\zeta)\sqrt{(\theta, \varphi)}\, \sin(\zeta)\sqrt{(\theta, \varphi)}\right]^\top. \quad \text{Eq. (20)}$$

Because many antenna patterns have strong directional characteristics, an antenna pattern may be modelled as a mixture of M spherical Gaussians (or von Mises-Fisher distributions):

$$G(\theta, \varphi) = \eta_{rad} \sum_{i=1}^{M} \frac{w_i}{a_i} e^{\lambda_i \mu_i^\top \hat{r}(\theta,\varphi)} \quad \text{Eq. (21)}$$

$$a_i = \frac{2\pi}{\lambda_i}\left(e^{\lambda_i} - e^{-\lambda_i}\right) \quad \text{Eq. (22)}$$

where $\eta_{rad} \in [0,1]$ is the radiation efficiency, $w_i \in [0,1]$ are mixture weights satisfying $\Sigma_i w_i = 1, \lambda_i > 0$ are concentration parameters, and $\mu_i \in \mathbb{R}^3$ are unit norm mean directions. All of these quantities may be modeled as trainable variables.

In contrast to antenna patterns, scattering patterns are defined on the hemisphere and take three arguments, namely the direction of the incoming and outgoing rays, as well as the surface normal. Both differences make parametrization of the scattering patterns more difficult. A backscattering lobe model for diffuse reflection (scattering) results in a scattering pattern having the following form $$f_s(\hat{k}_i, \hat{k}_s, \hat{n}) = \frac{1}{F_{\alpha_r \alpha_s}(\theta_i)} \times \left[\Lambda\left(\frac{1+\hat{k}_r^\top \hat{k}_s}{2}\right)^{\alpha_r} + (1-\Lambda)\left(\frac{1+\hat{k}_j^\top \hat{k}_s}{2}\right)^{\alpha_s}\right], \quad \text{Eq. (23)}$$

where $F_{\alpha_r \alpha_s}(\theta_i)$ normalizes the hemispherical integral of the pattern to one, $\alpha_r$, $\alpha_s \geq 1$ are integer parameters that control the lobe width, and $\Lambda \in [0,1]$ determines the fraction of the scattered energy in the specular lobe. The basis transformation matrix $D_{j+1}$ ensures that energy transfer between both polarization directions is correctly applied. While a field transformation is differentiable in all material parameters σ, $\varepsilon_r$, S, and $K_x$ as well as Λ, this is not the case for $\alpha_r$ and $\alpha_s$.

The following model is differentiable and may be considered the hemispherical Gaussian-equivalent to equation (23) with the addition of a diffuse component, for the output $f_s(\hat{k}_i, \hat{k}_s, \hat{n})$ of the MLP 160:

$$f_s(\hat{k}_i, \hat{k}_s, \hat{n}) = \frac{w_1}{\pi}\hat{k}_s^{\top}\hat{n} + \frac{w_2}{a_2}e^{\lambda_2 \hat{k}_s^{\top}\hat{k}_i} + \frac{w_3}{a_3}e^{\lambda_3 \lambda_2 \hat{k}_s^{\top}\hat{k}_i} \quad \text{Eq. (24)}$$

where $\lambda_2,\lambda_2 \geq 0$ are concentration parameters, $w_i \in [0,1]$ are mixture weights satisfying $\Sigma_i w_i=1$, $\hat{k}_r$, $\hat{k}_i - 2(\hat{n}^T\hat{k}_i)\hat{n}$ is the direction of the specular reflection, and $a_i$, i=2, 3, are approximate normalization factors given by $$a_i = \frac{2\pi}{\lambda_1}\left(e^{-\lambda_1} - 1\right)(2s_i - 1) \quad \text{Eq. (25)}$$

$$s_i = \frac{e^{t_i}e^{t_i cos(\beta_i)} - 1}{(e^{t_i} - 1)\left(e^{t_i cos(\beta_i)} + 1\right)} \quad \text{Eq. (26)}$$

$$t_i = \sqrt{\lambda_i}\,\frac{1.6988\lambda_i^2 + 10.8438\lambda_i}{\lambda_i^2 + 6.62201\lambda_i + 10.2415} \quad \text{Eq. (27)}$$

$$\cos(\beta_2) = \hat{k}_s^{\top}\hat{k}_i \quad \text{Eq. (28)}$$

$$\cos(\beta_3) = \hat{k}_s^{\top}\hat{k}_r \quad \text{Eq. (29)}$$

The difference between the normalization factors $a_i$ in equations (22) and (25) arises because the integral of the hemispherical Gaussian has no closed-form solution for arbitrary values of $\cos(\beta_i)$. A heuristic approximation may be used that is differentiable.

Figure 2C:
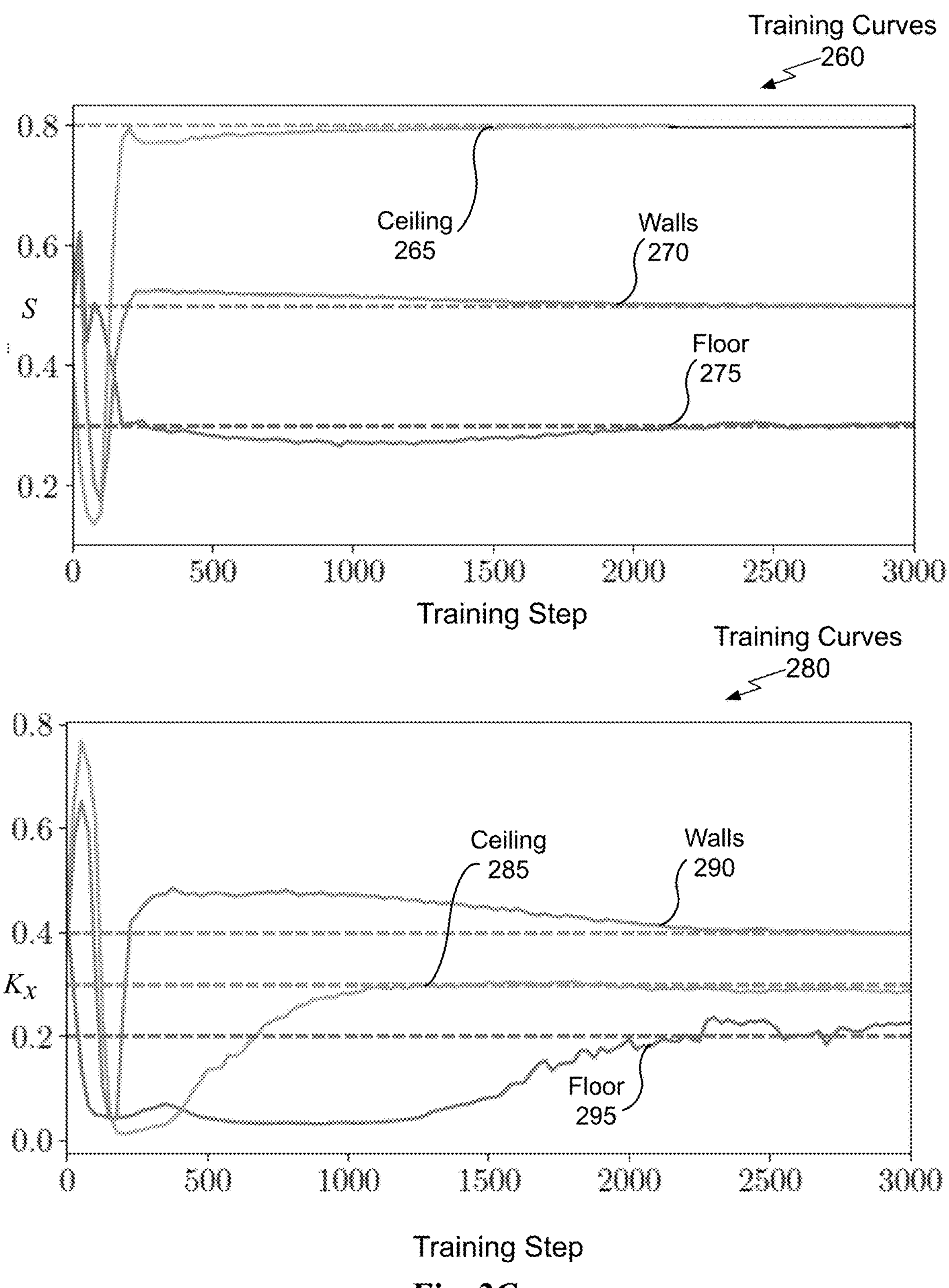
FIG. 2C illustrates training curves for additional scene parameters suitable for use in implementing some embodiments of the present disclosure.

FIG. 2C illustrates training curves for additional scene parameters suitable for use in implementing some embodiments of the present disclosure. The training curves 260 and 280 are associated with the same indoor scene as the training curves 220 and 240. Dashed and solid lines represent reference values (ground truth) and learned values, respectively. The curves for floor 275, walls 270, and ceiling 265 for training curves 260 are associated with the learned scattering coefficient (S) parameters of different materials and each curve converges to the respective reference values (ground truth) during training. The curves for floor 295, walls 290, and ceiling 285 for training curves 260 are associated with the learned XPD coefficient ($K_x$) parameters of different materials and each curve converges to the respective reference values (ground truth) during training. After the radio propagation modeling system 100 performs 3000 training steps (iterations), the trainable parameters have converged to the targeted values indicated by dashed lines. The training may be considered to be a sort of calibration of the radio propagation modeling system 100 with respect to the reference characteristics for a particular scene.

Figure 3A:
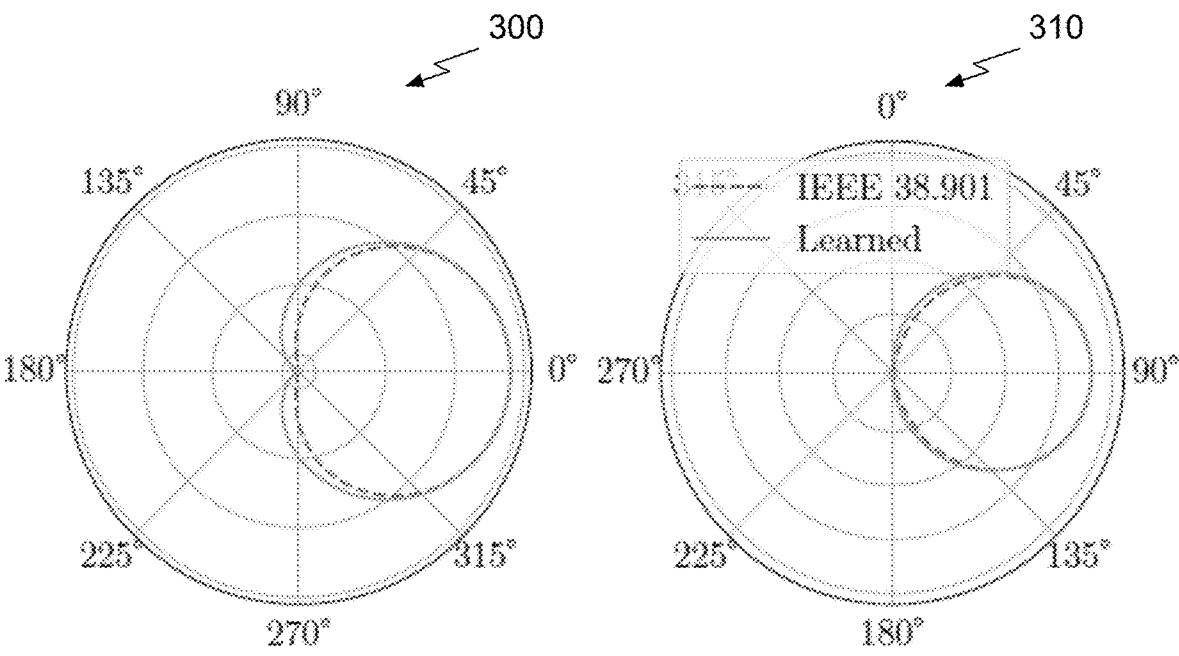
FIG. 3A illustrates a learned antenna pattern and a learned backscattering pattern suitable for use in implementing some embodiments of the present disclosure.
Figure 3A:
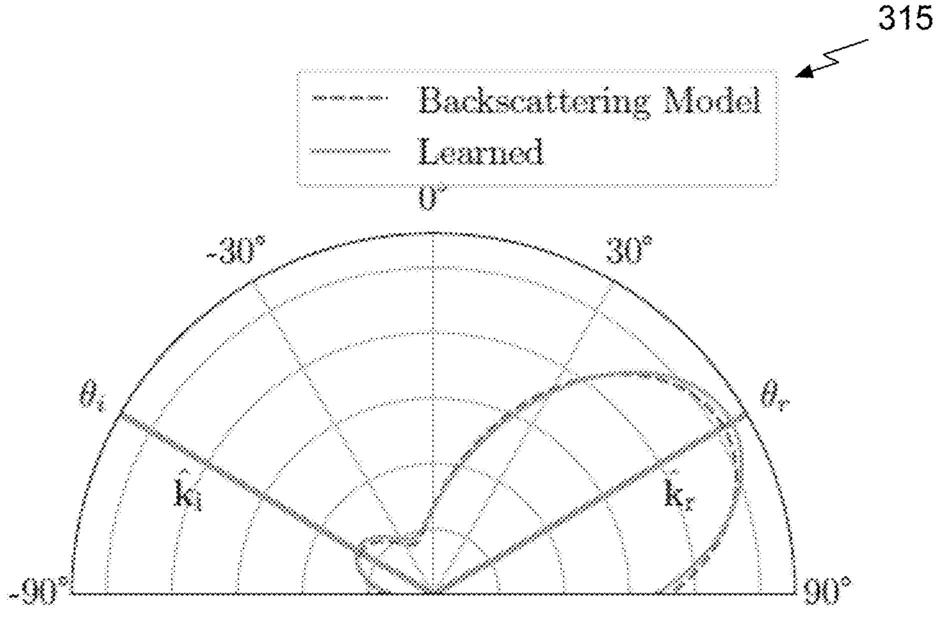

FIG. 3A illustrates learned antenna patterns 300 and 310 and a learned backscattering pattern 315 suitable for use in implementing some embodiments of the present disclosure. Graph 300 is a visualization of a horizontal cut of the learned antenna pattern for the indoor scene. Graph 310 is a visualization of a vertical cut of the learned antenna pattern for the indoor scene. The learned antenna patterns are illustrated as solid lines and the ground truths (IEEE 38.901) are illustrated with dashed lines. Graph 315 is a visualization of a learned backscattering pattern for the indoor scene. The quantities denote the angles of the incident and specular directions with the surface normal, respectively. The learned scattering pattern is illustrated as a solid line and the ground truth (backscattering model) is illustrated with a dashed line. The antenna patterns and scattering pattern match the respective ground truths very closely. Overall, the results demonstrate that it is possible to recover all scene parameters via gradient descent from an ideal synthetic dataset.

Figure 3B:
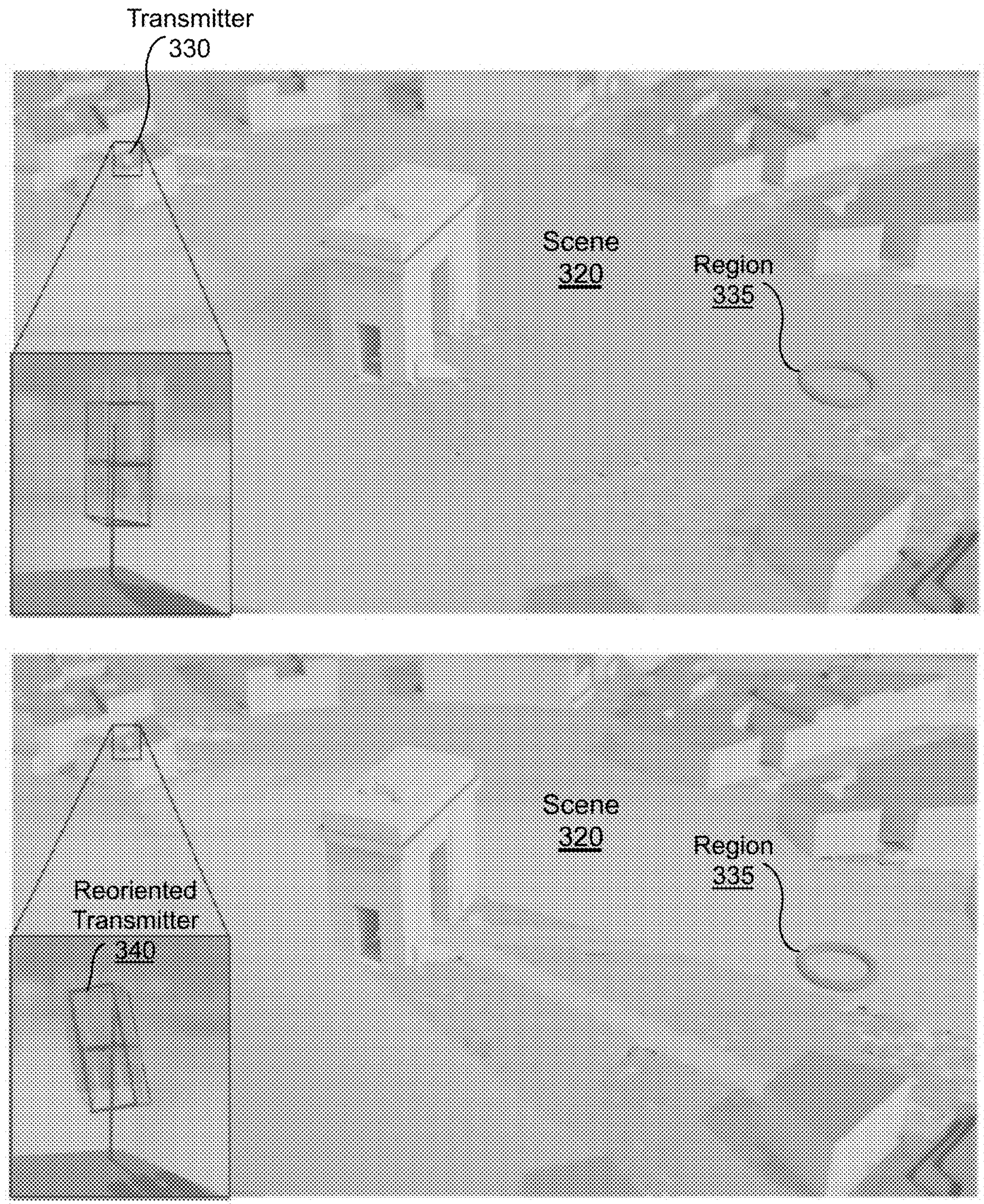
FIG. 3B illustrates a transmitter orientation before and after optimization, in accordance with an embodiment.

FIG. 3B illustrates a transmitter orientation before and after optimization, in accordance with an embodiment. A transmitter 330 is located on a building within scene 320. An inset image in the lower left corner of the scene 320 is a zoomed-in view of the transmitter 330. The radio propagation modeling system 100 computes simulated characteristics from which a coverage map is generated for a small region 335 located behind the Arc de Triomphe-like structure. The orientation of the transmitter 330 is then defined as a trainable parameter.

The radio propagation modeling system 100 performs gradient-based optimization of the orientation of the transmitter 330 with respect to the average received power within a small region 335 of the scene 320. During training, gradients of the average received power in the region 335 with respect to the orientation of the transmitter 330 are computed and used to optimize the orientation of the transmitter 330, maximizing the average received signal power in the region 335. The radio propagation modeling system 100 updates the orientation to produce the reoriented transmitter 340. The same approach may be used to optimize the joint orientation of multiple transmitters to maximize the weighted sum of signal-to-interference-plus-noise ratios (SINRs) in different regions of the scene 320, or to optimize antenna geometries, precoding codebooks, configurations of RIS, as well as many other scene parameters with respect to various metrics. In other embodiments, gradient-based methods are used to solve inverse problems, such as determining a user's position based on measured CIR.

FIG. 3C illustrates a flowchart of a method 350 for learning scene parameters by ray tracing of radio propagation, in accordance with an embodiment. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the radio propagation modeling system 100 of FIG. 1B. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 355, simulated radio characteristics for a 3D scene are computed, by a differentiable ray tracer, based on configured parameters and at least one trainable parameter corresponding to a scene property, where for each ray intersection point in the 3D scene, a neural component estimates the at least one trainable parameter. In an embodiment, the neural component comprises the neural component 135. In an embodiment, each ray intersection point is encoded into a higher dimension space for input to the neural component. For example, the positional encoder 140 encodes each ray intersection point into a higher dimensional space. In an embodiment, each ray intersection point is encoded using a multiresolution hash grid for input to the neural component. For example, in an embodiment, the positional encoder 140 comprises a multiresolution hash grid. In an embodiment, each ray intersection point is normalized to a unit cube and encoded into a higher dimensional space for input to the neural component. In an embodiment, each ray intersection point comprises at least one angle relative to a surface in the 3D scene at the intersection point. In an embodiment, the configured parameters or the at least one trainable parameter include one or more of scene geometry, configuration of reconfigurable intelligent surfaces and meta materials, antenna patterns, array geometries, and transmitter and receiver orientations and positions. In an embodiment, the scene property comprises at least one of relative permittivity, reflection coefficients, transmission coefficients, conductivity, effective roughness, and permeability of object surfaces and scattering functions. In an embodiment, the at least one trainable parameter comprises an antenna pattern that is modeled as a mixture of spherical Gaussian distributions. In an embodiment, the at least one trainable parameter is a scattering pattern that is modeled as a linear combination of components on a hemisphere. In an embodiment, the differentiable ray tracer computes paths of electromagnetic waves. In an embodiment, the simulated radio characteristics estimate qualities of a transmitted electromagnetic wave at a receiver. In an embodiment, the simulated radio characteristics comprise one or more of channel impulse responses, channel frequency responses, path delays, path losses, angles of arrival, angles of departure, amplitudes, powers, delay spread, Doppler spread, angular spread, power-delay-angular profile, and a number of paths.

At step 360, weights applied by the neural component are updated to estimate the at least one trainable parameter using gradient-based optimization to minimize a loss function of the simulated radio characteristics and reference radio characteristics. In an embodiment, wherein the neural component generates an embedding vector used to estimate the at least one trainable parameter. In an embodiment, the weights are updated to modify at least one of a meta material, a reconfigurable intelligent surface, an antenna pattern, an antenna orientation, and an antenna position. In an embodiment, the reference radio characteristics are measurements taken at different locations in the 3D scene.

In an embodiment, at least one of steps 355 or 360 is performed on a server or in a data center the simulated radio characteristics or an image generated from the simulated radio characteristics is streamed to a user device. In an embodiment, at least one of steps 355 or 360 is performed within a cloud computing environment. In an embodiment, at least one of steps 355 or 360 is performed for training, testing, or certifying a neural network employed in a machine, robot, or autonomous vehicle. In an embodiment, at least one of steps 355 or 360 is performed on a virtual machine comprising a portion of a graphics processing unit.

A differential ray tracing model, such as the radio propagation modeling system 100 may learn a digital twin of a radio environment by computing paths of electromagnetic (EM) waves. In an embodiment, rather than modeling the scene geometry and learning the scene properties of the geometry directly, variables of a differentiable parametric function, such as a neural network, etc. that computes one or more of the trainable parameters or scene properties may be modeled as neural materials. Neural materials can effectively represent objects' electromagnetic behaviors in a scene, offering a unique perspective on the environment through the lens of radio propagation.

In an embodiment, one or more of the scene geometry, scene properties, and antenna characteristics are computed by the differentiable parametric function and parameters of the differentiable parametric function are learned using the differentiable ray tracing. Scene properties for EM materials, such as, but not limited to, distance-dependent path loss, relative permittivity, reflection coefficients, transmission coefficients, conductivity, effective roughness, and permeability of object surfaces and scattering, and diffraction functions may be learned. Additional scene properties may include reconfigurable intelligent surfaces (RIS), meta materials, antenna patterns, array geometries, and well as transmitter and receiver directivity, orientations, and positions. The scene geometry including object locations, orientation, and scales, can be simultaneously optimized with the scene properties which is important because the scene geometry influences the channel characteristics. Performing gradient-based calibration using the differentiable ray tracer and neural components of the radio propagation modeling system 100 enables scene calibration with differentiable parameterizations of material properties, scattering behaviors, and antenna patterns.

Parallel Processing Architecture

Figure 4:
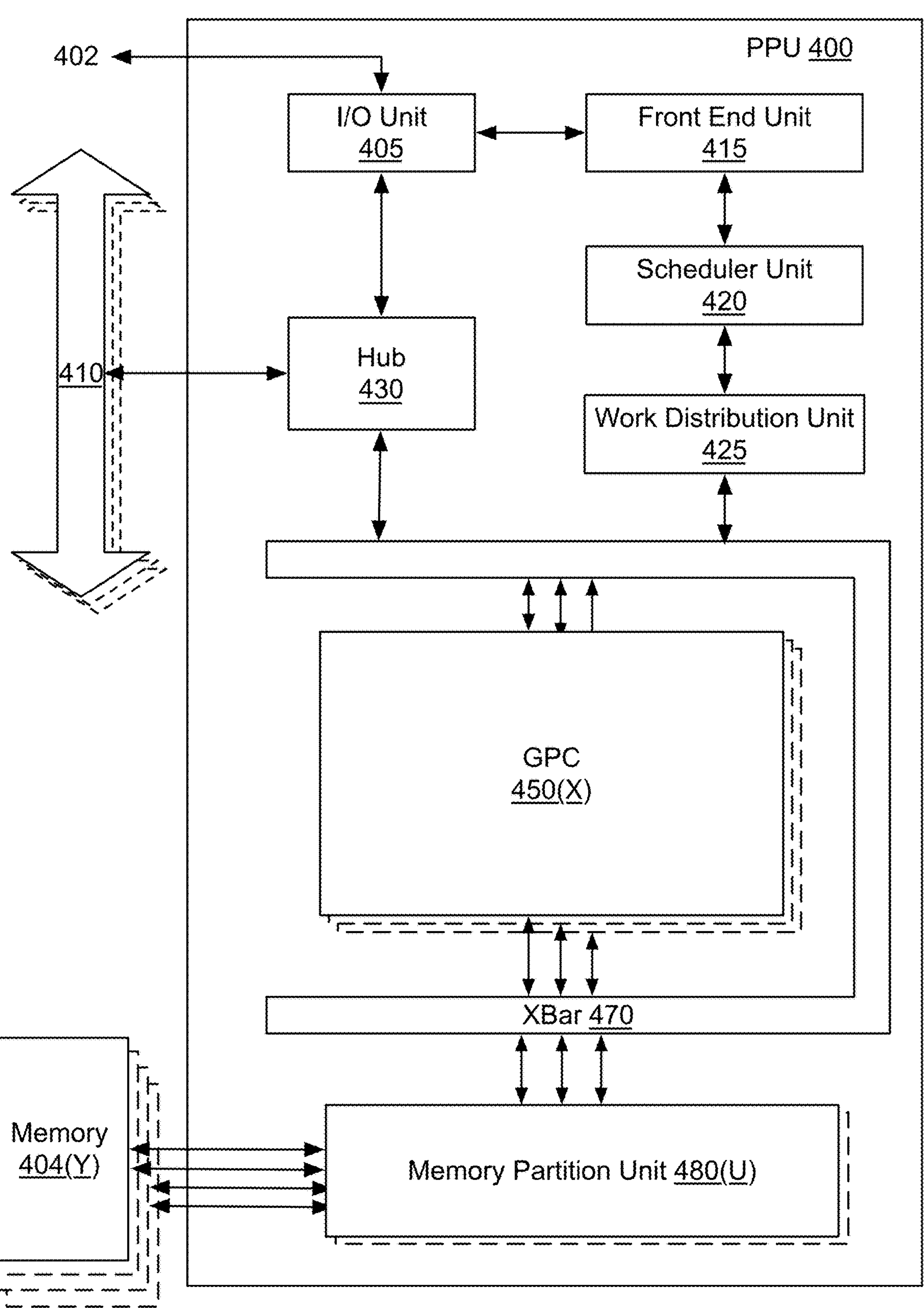
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the radio propagation modeling system 100. The PPU 400 may be used to implement one or more of the radio propagation simulation unit 110, the loss computation unit 120, the parameter unit 125, and the optimization unit 130 within the radio propagation modeling system 100. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in an L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
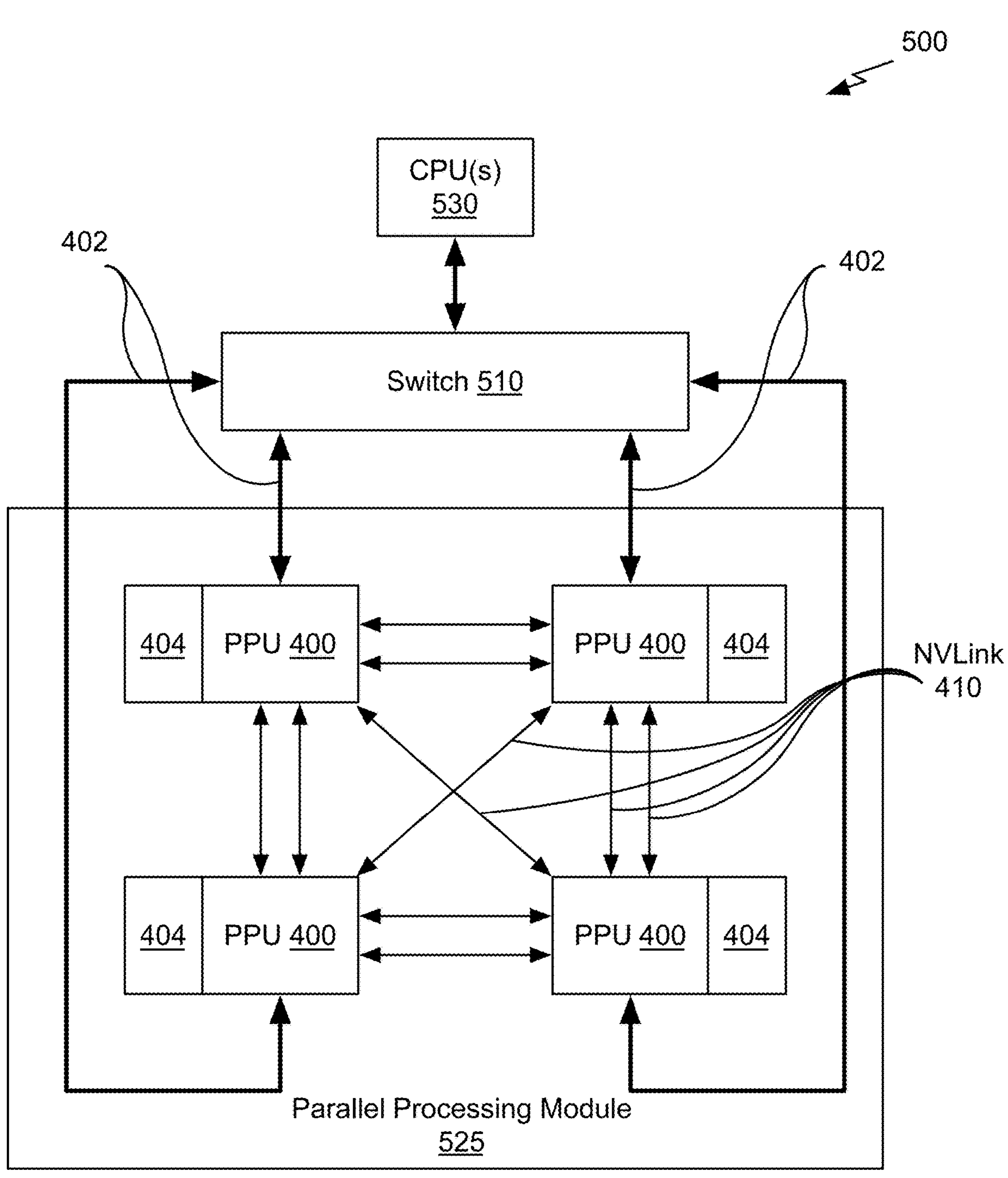
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 350 shown in FIG. 3C. The processing system 500 includes a CPU 530, switch 510, and multiple PPUs 400, and respective memories 404.

Figure 5B:
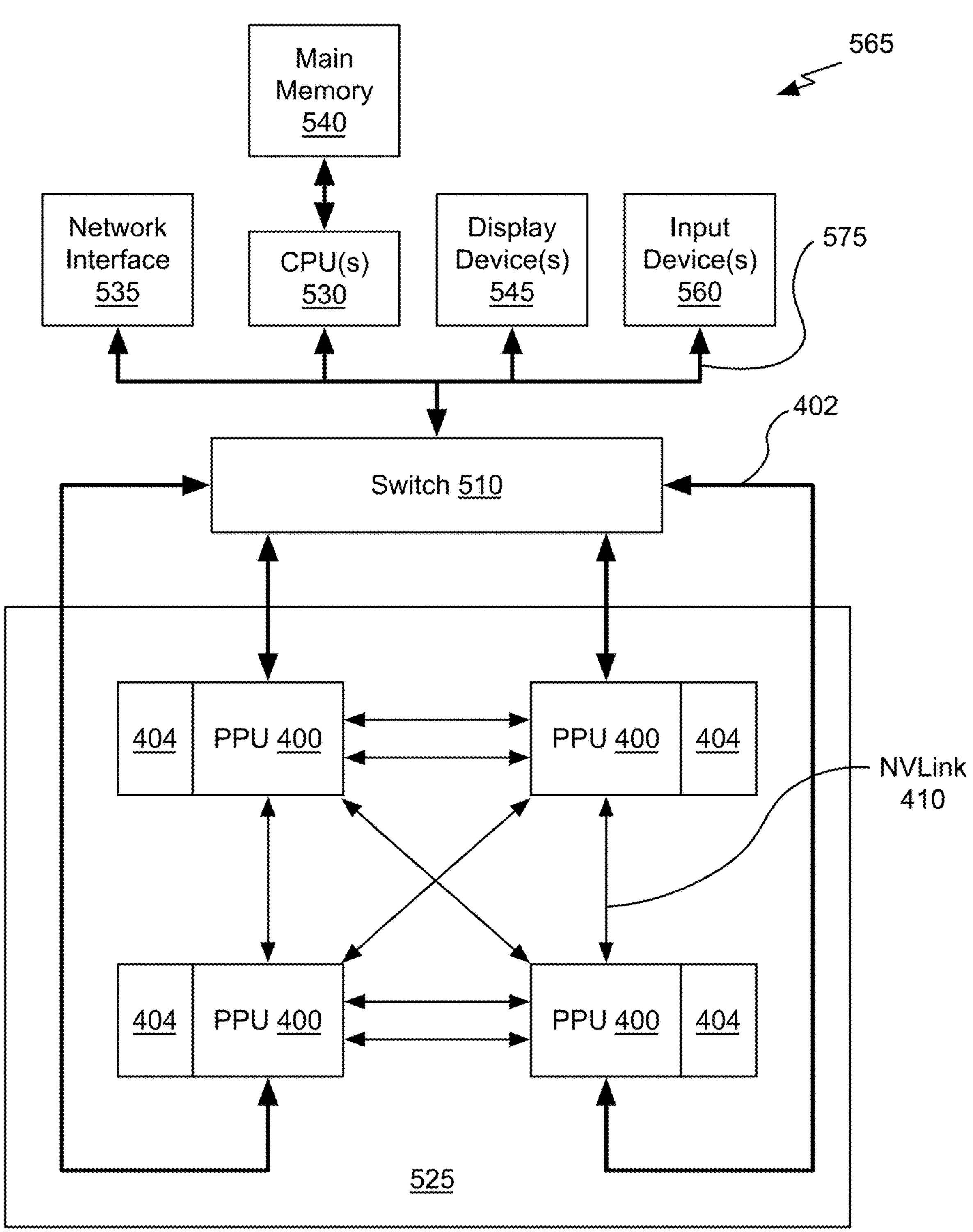
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 350 shown in FIG. 3C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
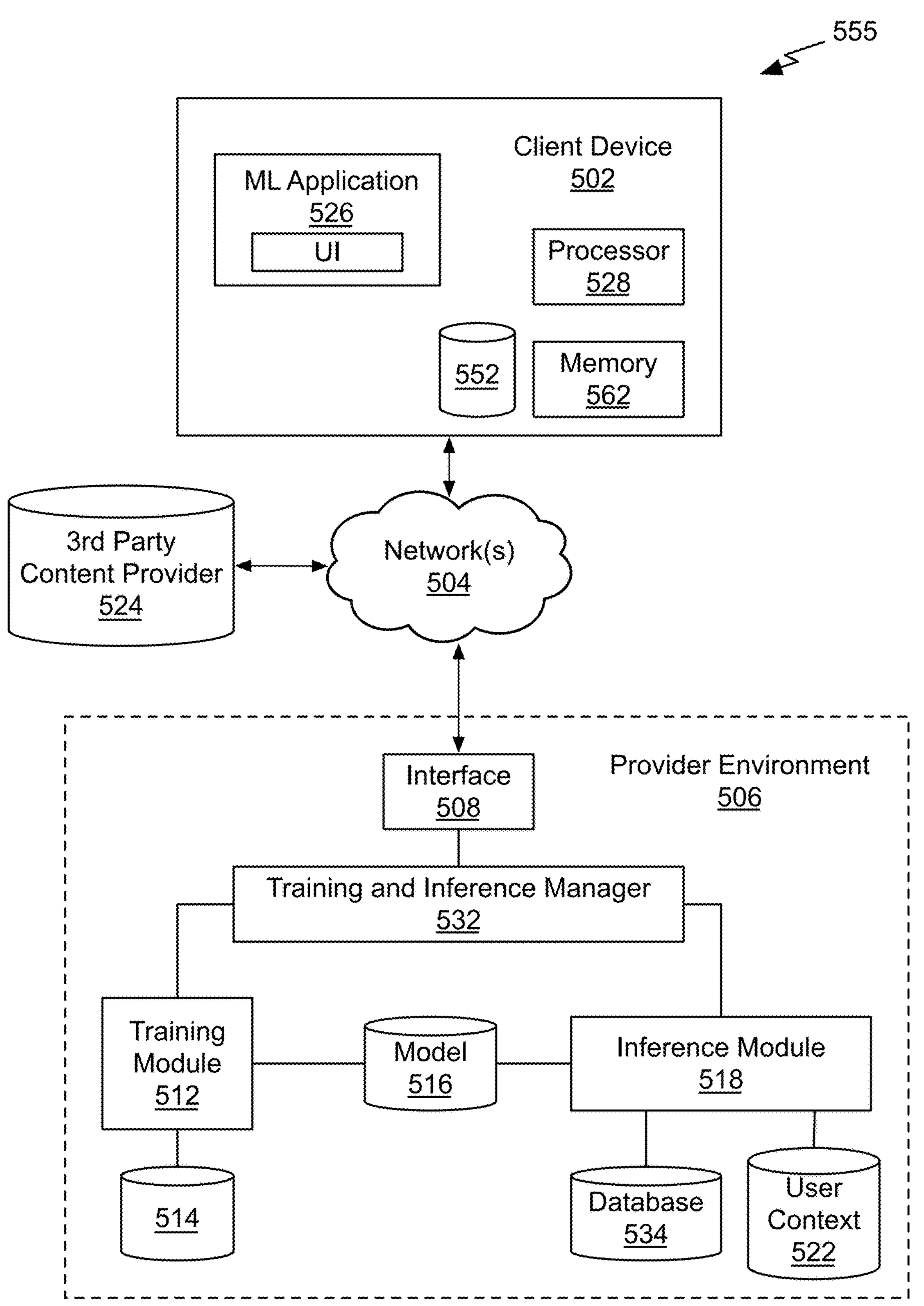
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network. In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
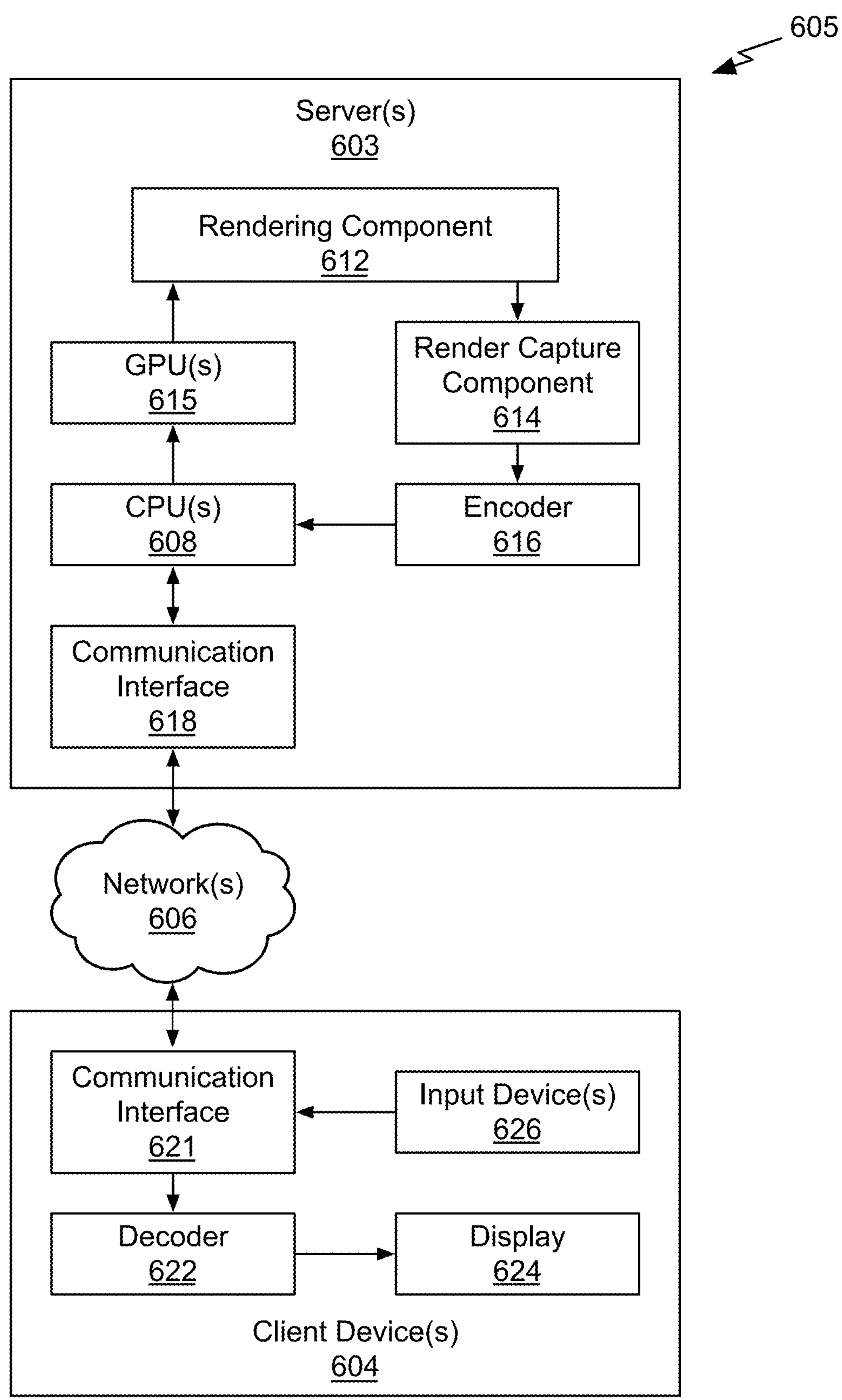
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:

computing, by a differentiable ray tracer, simulated radio characteristics for a three-dimensional (3D) scene based on configured parameters and at least one trainable parameter corresponding to a scene property, wherein for each ray intersection point in the 3D scene, a neural component estimates the at least one trainable parameter; and updating weights applied by the neural component to estimate the at least one trainable parameter using gradient-based optimization to minimize a loss function of the simulated radio characteristics and reference radio characteristics, wherein the at least one trainable parameter comprises a scattering pattern that is modeled as a linear combination of components on a hemisphere.

2. The computer-implemented method of claim 1, wherein the neural component generates an embedding vector used to estimate the at least one trainable parameter.

3. The computer-implemented method of claim 1, wherein each ray intersection point is encoded into a higher dimension space for input to the neural component.

4. The computer-implemented method of claim 1, wherein each ray intersection point is encoded using a multiresolution hash grid for input to the neural component.

5. The computer-implemented method of claim 1, wherein each ray intersection point is normalized to a unit cube and encoded into a higher dimension space for input to the neural component.

6. The computer-implemented method of claim 1, wherein each ray intersection point comprises at least one angle relative to a surface in the 3D scene at the intersection point.

7. The computer-implemented method of claim 1, further comprising updating the weights to modify at least one of a meta material, a reconfigurable intelligent surface, an antenna pattern, an antenna orientation, and an antenna position.

8. The computer-implemented method of claim 1, wherein the configured parameters or the at least one trainable parameter include one or more of scene geometry, configuration of reconfigurable intelligent surfaces and meta materials, antenna patterns, array geometries, and transmitter and receiver orientations and positions.

9. The computer-implemented method of claim 1, wherein the scene property comprises at least one of relative permittivity, reflection coefficients, transmission coefficients, conductivity, effective roughness, and permeability of object surfaces and scattering functions.

10. The computer-implemented method of claim 1, wherein the at least one trainable parameter comprises an antenna pattern that is modeled as a mixture of spherical Gaussian distributions.

11. The computer-implemented method of claim 1, wherein the differentiable ray tracer computes paths of electromagnetic waves.

12. The computer-implemented method of claim 1, wherein the simulated radio characteristics estimate qualities of a transmitted electromagnetic wave at a receiver.

13. The computer-implemented method of claim 1, wherein the simulated radio characteristics comprise one or more of channel impulse responses, channel frequency responses, path delays, path losses, angles of arrival, angles of departure, amplitudes, powers, delay spread, Doppler spread, angular spread, power-delay-angular profile, and a number of paths.

14. The computer-implemented method of claim 1, wherein the reference radio characteristics are measurements taken at different locations in the 3D scene.

15. The computer-implemented method of claim 1, wherein at least one of the steps of computing or updating is performed on a server or in a data center and the simulated radio characteristics or an image generated from the simulated radio characteristics is streamed to a user device.

16. The computer-implemented method of claim 1, wherein at least one of the steps of computing or updating is performed within a cloud computing environment.

17. The computer-implemented method of claim 1, wherein at least one of the steps of computing or updating is performed for training, testing, or certifying a neural network employed in a machine, robot, or autonomous vehicle.

18. The computer-implemented method of claim 1, wherein at least one of the steps of computing or updating is performed on a virtual machine comprising a portion of a graphics processing unit.

19. A system, comprising:

a memory that stores reference radio characteristics; and a processor that is connected to the memory, wherein the processor is configured to produce simulated radio characteristics for a three-dimensional scene (3D) by:

computing, by a differentiable ray tracer, the simulated radio characteristics for the 3D scene based on configured parameters and at least one trainable parameter corresponding to a scene property, wherein for each ray intersection point in the 3D scene, a neural component estimates the at least one trainable parameter; and updating weights applied by the neural component to estimate the at least one trainable parameter using gradient-based optimization to minimize a loss function of the simulated radio characteristics and the reference radio characteristics, wherein the at least one trainable parameter comprises a scattering pattern that is modeled as a linear combination of components on a hemisphere.

20. The system of claim 19, wherein the differentiable ray tracer computes paths of electromagnetic waves.

21. A non-transitory computer-readable mediummedia storing computer instructions that, when executed by one or more processors, cause the one or more processors to perform the steps of:

computing, by a differentiable ray tracer, simulated radio characteristics for a three-dimensional (3D) scene based on configured parameters and at least one trainable parameter corresponding to a scene property, wherein for each ray intersection point in the 3D scene, a neural component estimates the at least one trainable parameter; and updating weights applied by the neural component to estimate the at least one trainable parameter using gradient-based optimization to minimize a loss function of the simulated radio characteristics and reference radio characteristics, wherein the at least one trainable parameter comprises a scattering pattern that is modeled as a linear combination of components on a hemisphere.

22. The non-transitory computer-readable medium of claim 21, wherein the differentiable ray tracer computes paths of electromagnetic waves.

* * * * *